(12) United States Patent
Ohmura et al.

(10) Patent No.: US 11,979,683 B2
(45) Date of Patent: May 7, 2024

(54) VIDEO PROCESSING DEVICE AND VIDEO PROCESSING SYSTEM

(71) Applicant: Panasonic Intellectual Property Management Co., Ltd., Osaka (JP)

(72) Inventors: Yohei Ohmura, Kanagawa Ken (JP); Yuji Matsumoto, Kanagawa Ken (JP); Takeshi Shitashimizu, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 86 days.

(21) Appl. No.: 17/400,714

(22) Filed: Aug. 12, 2021

(65) Prior Publication Data
US 2022/0060655 A1 Feb. 24, 2022

(30) Foreign Application Priority Data

Aug. 21, 2020 (JP) .................................. 2020-140425
Mar. 9, 2021 (JP) .................................. 2021-037669

(51) Int. Cl.
*H04N 7/18* (2006.01)
*B60K 35/00* (2006.01)
(Continued)

(52) U.S. Cl.
CPC ........... *H04N 7/0102* (2013.01); *B60K 35/00* (2013.01); *G06V 20/56* (2022.01); *B60K 35/28* (2024.01);
(Continued)

(58) Field of Classification Search
CPC ........ H04N 7/0102; H04N 7/18; G06V 20/56; B60K 35/00; B60K 2370/165; B60K 2370/176
(Continued)

(56) References Cited

U.S. PATENT DOCUMENTS 10,358,090 B2 * 7/2019 Shiohara ................... H04N 5/12
10,672,276 B2 * 6/2020 Shiohara ................... B60R 1/00
(Continued)

FOREIGN PATENT DOCUMENTS

CN 205193902 4/2016
CN 107113394 8/2017
(Continued)

OTHER PUBLICATIONS

Office Action issued by the China National Intellectual Property Administration (CNIPA) in Chinese Patent Application No. 202110951076.2, dated Aug. 30, 2023, together with an English language translation.

*Primary Examiner* — Trang U Tran
(74) *Attorney, Agent, or Firm* — Greenblum & Bernstein, P.L.C.

(57) ABSTRACT

A video processing device installable in a vehicle is disclosed. The vehicle includes: an imaging device imaging an outside of the vehicle and generating a first video signal; and a display device displaying a first video and a second video, the first video being generated based on the first video signal, the second video being generated by performing first processing on the first video signal. The video processing device includes: a first reception circuit to receive the first video signal from the imaging device; a hardware processor to receive the first video signal from the first reception circuit and perform the first processing; and a first transmission circuit to receive the first video signal from the first reception circuit, receive, from the hardware processor, a second video signal for displaying the second video, and transmit the first/second video signals to the display device.

20 Claims, 13 Drawing Sheets

(51) Int. Cl.
*G06V 20/56* (2022.01)
*H04N 7/01* (2006.01)
*B60K 35/28* (2024.01)

(52) U.S. Cl.
CPC .. *B60K 2360/165* (2024.01); *B60K 2360/176* (2024.01)

(58) Field of Classification Search
USPC .................................................. 348/148, 441
See application file for complete search history.

(56) References Cited

U.S. PATENT DOCUMENTS

| | | |
|---|---|---|
| 11,055,870 B2 * | 7/2021 | Naik .......................... G06T 7/74 |
| 11,164,010 B2 * | 11/2021 | Turk ........................ G06V 40/10 |
| 2017/0344543 A1 | 11/2017 | Inata et al. |
| 2020/0257719 A1 | 8/2020 | Inata et al. |
| 2021/0349934 A1 | 11/2021 | Inata et al. |

FOREIGN PATENT DOCUMENTS

| | | |
|---|---|---|
| CN | 110675528 | 1/2020 |
| JP | 2009-182665 | 8/2009 |
| JP | 2014-229049 | 12/2014 |
| KR | 10-2019-0012015 | 2/2019 |

\* cited by examiner

VIDEO PROCESSING DEVICE AND VIDEO PROCESSING SYSTEM

CROSS-REFERENCE TO RELATED APPLICATIONS

This application is based upon and claims the benefit of priority from Japanese Patent Application No. 2020-140425, filed on Aug. 21, 2020, and Japanese Patent Application No. 2021-037669, filed on Mar. 9, 2021, the entire contents of which are incorporated herein by reference.

FIELD

The present disclosure relates to a video processing device and a video processing system.

BACKGROUND

There is known a technique of imaging the outside of a vehicle by a camera and the like attached to a vehicle body, and utilizing the imaged video for various uses such as a check on an area behind the vehicle and recording of a video outside a vehicle. In a case of the use of the check on an area behind a vehicle, the imaged video is subjected to predetermined processing performed by a display unit, for example, and is projected on an electron mirror included in the display unit. In a case of the use of the recording of a video outside a vehicle, the imaged video is subjected to predetermined processing performed by a drive recorder unit, for example, and is projected on a panel type display and the like. A related art is disclosed in, for example, Japanese Patent Application Laid-open No. 2014-229049.

There is a demand for further improving of video processing devices.

SUMMARY

A video processing device according to the present disclosure is installable in a vehicle. The vehicle includes: an imaging device imaging an outside of the vehicle and generating a first video signal; and a display device being able to display a first video and a second video, the first video being generated based on the first video signal, the second video being generated by performing first processing on the first video signal. The video processing device includes a first reception circuit, a hardware processor, and a first transmission circuit. The first reception circuit is configured to receive the first video signal from the imaging device. The hardware processor is configured to receive the first video signal from the first reception circuit and configured to perform the first processing on the first video signal. The first transmission circuit is configured to: receive the first video signal from the first reception circuit; receive, from the hardware processor, a second video signal being a signal for displaying the second video; and transmit the first video signal and the second video signal to the display device.

DETAILED DESCRIPTION

Figure 1:
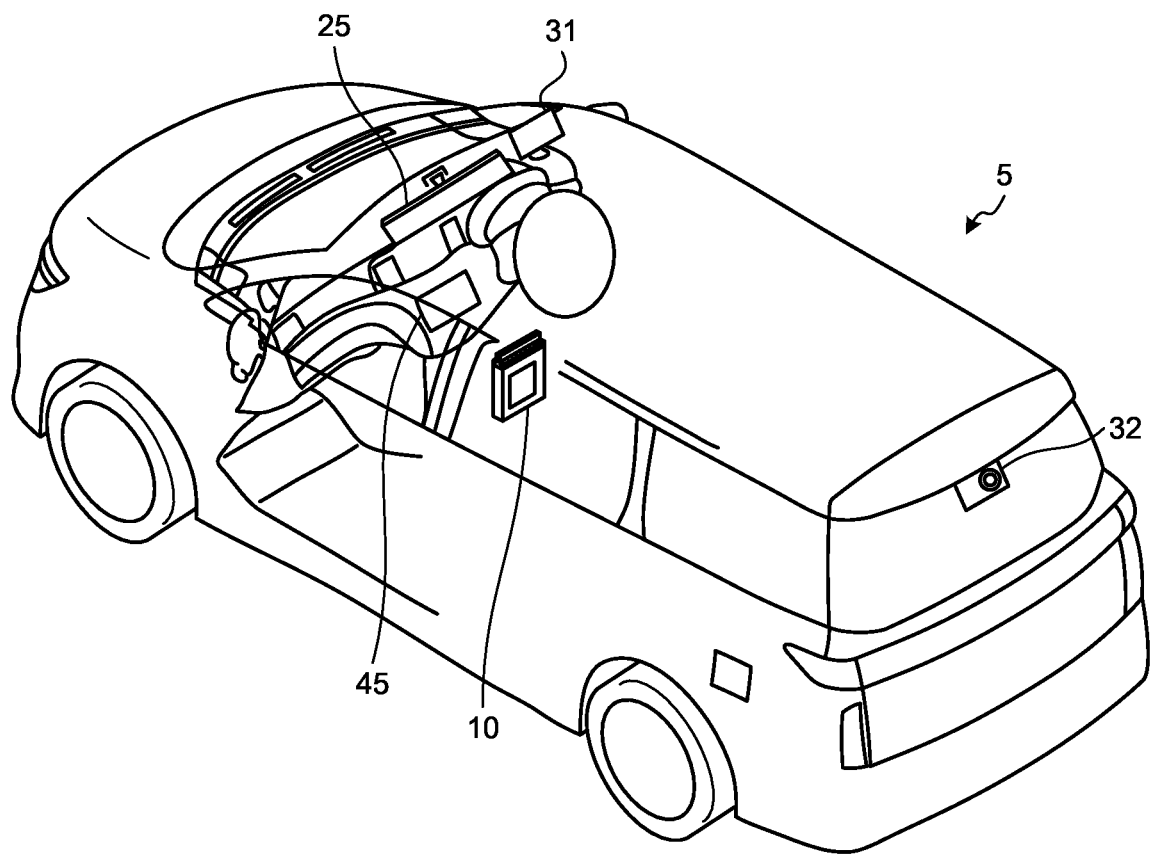
FIG. 1 is a schematic diagram illustrating an example of a vehicle including a drive recorder unit according to a first embodiment.

An outline of aspects of the present disclosure are as follows.

Item 1

A video processing device installable in a vehicle, the vehicle including: an imaging device imaging an outside of the vehicle and generating a first video signal; and a first display device being able to display a first video and a second video, the first video being generated based on the first video signal, the second video being generated by performing first processing on the first video signal, the video processing device including: a first reception unit configured to receive the first video signal from the imaging device; a video processing unit configured to receive the first video signal from the first reception unit and configured to perform the first processing on the first video signal; and a first transmission unit configured to receive the first video signal from the first reception unit, to be able to receive from the video processing unit a second video signal as a signal for displaying the second video, and to be able to transmit the first video signal and the second video signal to the first display device.

Item 2

The video processing device according to Item 1 is able to switch between a first mode for causing the first display device to display the first video and a second mode for causing the first display device to display the second video.

Item 3

The video processing device according to Item 2 is configured to switch the first mode to the second mode later than a first time point at which the video processing unit is enabled to perform the first processing.

Item 4

The video processing device according to Item 3 is configured to switch the first mode to the second mode at a second time point during a stop of the vehicle, the second time point being later than the first time point.

Item 5

The video processing device according to any one of Items 2 to 4 is configured to cause the first display device to display a black screen at the time when the first mode is switched to the second mode.

Item 6

The video processing device according to any one of Items 1 to 5, further includes: a first control unit configured to control the first reception unit and the first transmission unit; and a second control unit different from the first control unit, the second control unit including the video processing unit.

Item 7

In the video processing device according to Item 6, the first control unit and the second control unit operate independent of each other.

Item 8

The video processing device according to Item 6 or 7 is configured to switch a second mode for causing the first display device to display the second video to a first mode for causing the first display device to display the first video in a case of detecting a failure in the second control unit.

Item 9

The video processing device according to any one of Items 2 to 5, further includes: a first control unit configured to control the first reception unit and the first transmission unit; and a second control unit configured to control the video processing unit and the first transmission unit, wherein, in the first mode, the first control unit causes the first transmission unit to transmit the first video signal to the first display device, and, in the second mode, the second control unit causes the first transmission unit to transmit the second video signal to the first display device.

Item 10

In the video processing device according to Item 9, the first control unit and the second control unit operate independent of each other.

Item 11

The video processing device according to Item 9 is configured to switch the second mode to the first mode in a case of detecting a failure in the second control unit.

Item 12

In the video processing device according to any one of Items 1 to 11, the first processing includes processing of: detecting an object present around the vehicle based on the first video signal; and adding, to the first video signal, an emphasis signal for emphasizing the object.

Item 13

The video processing device according to any one of Items 1 to 12, further includes: a second display device configured to display a third video generated by performing second processing on the first video signal; and a second transmission unit configured to transmit, to the second display device, a third video signal for displaying the third video.

Item 14

A video processing system installable in a vehicle, the video processing system including: an imaging device configured to image an outside of a vehicle and generate a first video signal; a first display device configured to display a first video and a second video, the first video being generated by performing first processing on the first video signal, the second video being generated by performing second processing on the first video signal; and a video processing device configured to perform the second processing on the first video signal, wherein the video processing device includes: a first reception unit configured to receive the first video signal from the imaging device; a video processing unit configured to receive the first video signal from the first reception unit and configured to perform the second processing on the first video signal; and a first transmission unit configured to receive the first video signal from the first reception unit, to be able to receive a second video signal as a signal for displaying the second video from the video processing unit, and to be able to transmit the first video signal and the second video signal to the first display device.

Item 15

In the video processing system according to Item 14, the video processing device is able to switch between a first mode for causing the first display device to display the first video and a second mode for causing the first display device to display the second video.

Item 16

In the video processing system according to Item 14 or 15, the video processing device includes: a first control unit configured to control the first reception unit and the first transmission unit; and a second control unit configured to control the video processing unit.

Item 17

In the video processing system according to Item 16, the first control unit and the second control unit operate independent of each other.

Item 18

In the video processing system according to Item 15, the video processing device includes: a first control unit configured to control the first reception unit and the first transmission unit; and a second control unit configured to control the video processing unit and the first transmission unit, wherein, in the first mode, the first control unit causes the first transmission unit to transmit the first video signal to the first display device, and, in the second mode, the second control unit causes the first transmission unit to transmit the second video signal to the first display device.

Item 19

The video processing system according to Item 18 is configured to switch the second mode to the first mode in a case of detecting a failure in the second control unit.

Item 20

A video processing device installable in a vehicle, the vehicle including: an imaging device imaging an outside of the vehicle and generating a first video signal; and a display device being able to display a first video and a second video, the first video being generated based on the first video signal, the second video being generated based on a second video signal obtained by adding a first signal to the first video signal, the video processing device including: a first reception unit configured to receive the first video signal from the imaging device; a video processing unit configured to receive the first video signal from the first reception unit, and configured to generate the first signal based on the first video signal; and a first transmission unit configured to receive the first video signal from the first reception unit, to be able to receive the first signal from the video processing unit, and to be able to transmit the first video signal and the first signal to the display device.

Item 21

In the video processing device according to Item 20, the display device includes a video signal generation unit configured to generate the second video signal by adding the first signal to the first video signal.

Item 22

The video processing device according to Item 20 or 21 is configured to switch between a first mode for causing the display device to display the first video and a second mode for causing the display device to display the second video.

Item 23

The video processing device according to any one of Items 20 to 22, further includes: a first control unit configured to control the first reception unit and the first transmission unit; and a second control unit different from the first control unit, the second control unit including the video processing unit.

Item 24

The video processing device according to Item 22, further includes: a first control unit configured to control the first reception unit and the first transmission unit; and a second control unit configured to control the video processing unit and the first transmission unit, wherein, in the first mode, the first control unit causes the first transmission unit to transmit the first video signal to the display device, and, in the second mode, the second control unit causes the first transmission unit to transmit the first video signal and the first signal to the display device.

Item 25

In the video processing device according to Item 23 or 24, the first control unit and the second control unit operate independent of each other.

Item 26

In the video processing device according to any one of Items 20 to 25, the video processing unit detects an object present around the vehicle based on the first video signal, and generates an emphasis signal for emphasizing the object as the first signal.

Item 27

A video processing system installable in a vehicle, the video processing system including: an imaging device configured to image an outside of the vehicle and generate a first video signal; a first display device configured to display a first video and a second video, the first video being generated based on the first video signal, the second video being generated based on a second video signal obtained by adding a first signal to the first video signal; and a video processing device configured to generate the first signal, wherein the video processing device includes: a first reception unit configured to receive the first video signal from the imaging device; a video processing unit configured to receive the first video signal from the first reception unit and configured to generate the first signal based on the first video signal; and a first transmission unit configured to receive the first video signal from the first reception unit, to be able to receive the first signal from the video processing unit, and to be able to transmit the first video signal and the first signal to the first display device.

Item 28

In the video processing system according to Item 27, the first display device includes a video signal generation unit configured to generate the second video signal by adding the first signal to the first video signal.

Item 29

In the video processing system according to Item 27 or 28, the video processing device is able to switch between a first mode for causing the first display device to display the first video and a second mode for causing the first display device to display the second video.

Item 30

In the video processing system according to any one of Items 27 to 29, the video processing device includes: a first control unit configured to control the first reception unit and the first transmission unit; and a second control unit configured to control the video processing unit.

Item 31

In the video processing system according to Item 29, the video processing device includes: a first control unit configured to control the first reception unit and the first transmission unit; and a second control unit configured to control the video processing unit and the first transmission unit, wherein, in the first mode, the first control unit causes the first transmission unit to transmit the first video signal to the first display device, and, in the second mode, the second control unit causes the first transmission unit to transmit the first video signal and the first signal to the first display device.

Item 32

In the video processing system according to Item 30 or 31, the first control unit and the second control unit operate independent of each other.

Item 33

In the video processing system according to any one of Items 27 to 32, the video processing unit detects an object present around the vehicle based on the first video signal, and generates an emphasis signal for emphasizing the object as the first signal.

The following describes embodiments of a video processing device and a video processing system according to the present disclosure with reference to the drawings.

First Embodiment

Configuration Example of Vehicle

FIG. 1 is a schematic diagram illustrating an example of a vehicle 5 including a drive recorder unit 10 according to a first embodiment. As illustrated in FIG. 1, the vehicle according to the first embodiment includes, for example, the drive recorder unit 10, a rear camera 32, and a display device 25. The vehicle 5 may also include a front camera 31 and a display 45. The following describes an example that the vehicle 5 includes the front camera 31 and the display 45.

The front camera 31 is disposed on a windshield of the vehicle 5, for example. The front camera 31 images the outside of the vehicle 5, and generates a fourth video signal. The front camera 31 images an area in front of the vehicle 5, for example. The fourth video signal includes information of a front video, for example. The front video is a video obtained by imaging an area in front of the vehicle 5 by the front camera 31.

The rear camera 32 is disposed on a rear window of the vehicle 5, for example. The rear camera 32 images the outside of the vehicle 5, and generates a first video signal. The rear camera 32 images an area behind the vehicle 5, for example. The first video signal includes information of a rear video, for example. The rear video is a video obtained by imaging an area behind the vehicle 5 by the rear camera 32. The rear camera 32 is an example of an imaging device.

The drive recorder unit 10 is housed in a console box of the vehicle 5, for example. The drive recorder unit 10 performs first processing on the first video signal received from the rear camera 32. The first processing includes, for example, processing of detecting an object present around the vehicle 5 based on the first video signal, and adding an emphasis signal for emphasizing the object to the first video signal. For example, the drive recorder unit 10 is an example of a video processing device. The drive recorder unit 10 may also perform second processing on the first video signal received from the rear camera 32. The drive recorder unit 10 may also perform third processing on the fourth video signal received from the front camera 31. The second processing and the third processing are each adjustments of a color and contrast to be suitable for recording of a video outside a vehicle and display on the display 45. The drive recorder unit 10 may also perform the second processing on the first video signal received from the rear camera 32, and generate a third video signal as a signal for displaying a third video. The third video will be described later.

The display device 25 displays an area behind the vehicle 5. The display device 25 displays the rear video of the vehicle 5, for example. The display device 25 is, for example, a liquid crystal display. The display device 25 may be a mirror type display device in a shape of a mirror for checking on an area behind the vehicle 5, for example. The display device 25 is an electron mirror, for example. The display device 25 displays the rear video on which predetermined processing has been performed by an electronic control unit (ECU) that is integrally installed together with the display device 25, for example. The display device 25 is an example of a display device. The display device 25 is also an example of a first display device. The electron mirror is an example of the mirror type display device. In the present embodiment, the display device 25 is an electron mirror in a shape of a room mirror. The display device 25 can display a first video as a video that is generated based on the first video signal. The first video is, for example, the rear video. The display device 25 can also display a second video as a video that is generated by performing the first processing on the first video signal. The second video is, for example, a video obtained by performing image processing on the first video. More specifically, the second video is a video obtained by emphasizing the object displayed in the first video, for example.

In FIG. 1, the display device 25 is illustrated as the electron mirror in the shape of the room mirror. However, in a case that the display device 25 is an electron mirror, the display device 25 may be an electron mirror in another shape for checking on an area behind the vehicle 5. The display device 25 may also be an electron mirror having a shape of a door mirror or a fender mirror, for example.

The display 45 is, for example, a liquid crystal display. The display 45 may be a panel-type liquid crystal display inserted into an instrument panel and the like, for example. The display 45 may be able to display the third video as a video that is generated by performing the second processing on the first video signal. The third video is a video obtained by performing image processing on the first video, for example. More specifically, the third video is a video obtained by emphasizing the object to be displayed and adjusting a color and contrast in the first video, for example. The display 45 may be able to display a fourth video as a video that is generated by performing the third processing on the fourth video signal. The fourth video is a video obtained by performing image processing on the front video, for example. More specifically, the fourth video is, for example, a video obtained by emphasizing the object to be displayed and adjusting a color and contrast in the front video, for example. The display 45 is an example of a second display device.

The display 45 may display a video imaged by another camera (not illustrated) that is disposed on a side surface, in a compartment, and the like of the vehicle 5. The display may display a video obtained by compositing videos of a plurality of cameras that image the outside of the vehicle including the front camera 31 and the rear camera 32. The video obtained by compositing videos of a plurality of cameras is, for example, an omnidirectional overhead view video. The drive recorder unit 10, the rear camera 32, and the display device 25 described above are part of a video processing system (described later). The front camera 31 and the display 45 may also be part of the video processing system (described later).

Configuration Example of Video Processing System

Figure 2:
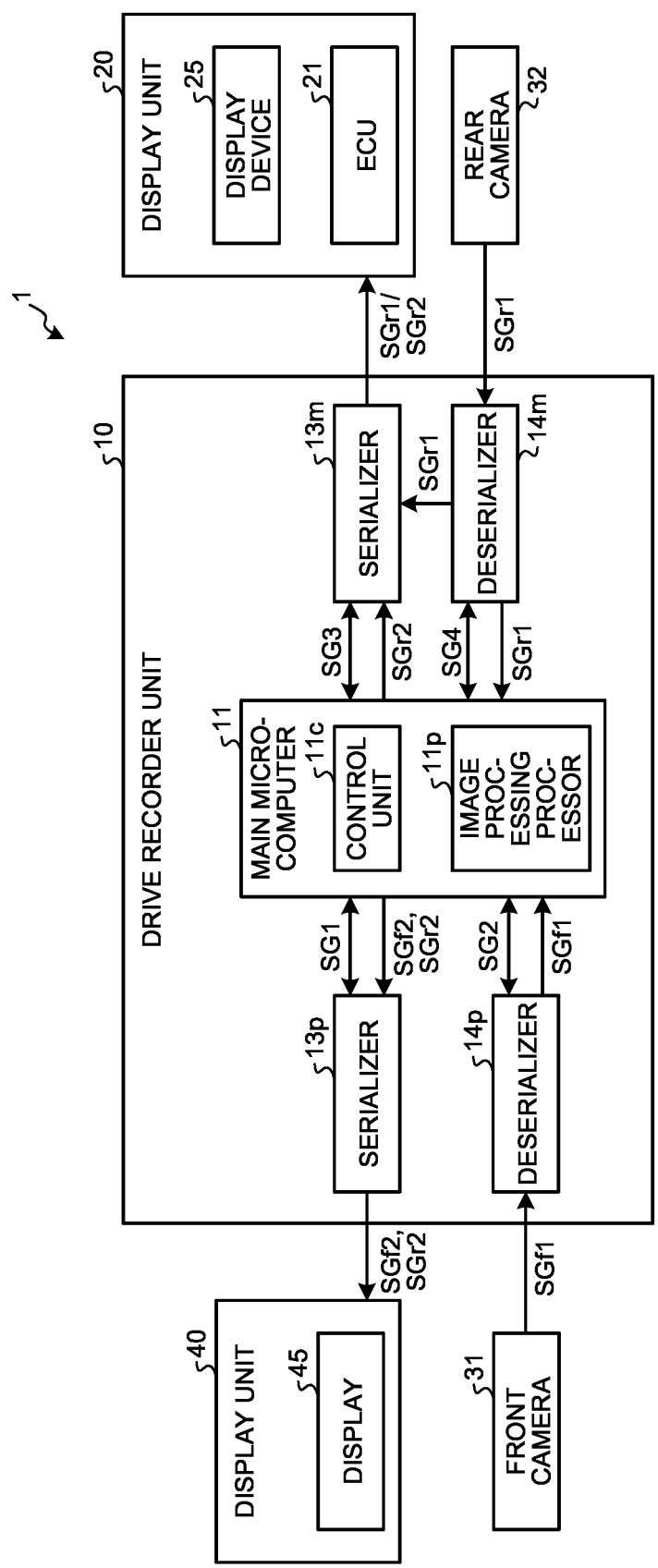
FIG. 2 is a block diagram illustrating an example of a configuration of a video processing system according to the first embodiment.

FIG. 2 is a block diagram illustrating an example of a configuration of a video processing system 1 according to the first embodiment. As illustrated in FIG. 2, the video processing system 1 according to the first embodiment includes the drive recorder unit 10, a display unit 20, and the rear camera 32. The video processing system 1 according to the first embodiment is installable in, for example, the vehicle 5 described above. The video processing system 1 may also include the front camera 31 and a display unit 40. The following describes an example that the video processing system 1 includes the front camera 31 and the display unit 40.

The drive recorder unit 10 includes a main microcomputer 11, a serializer 13m, and a deserializer 14m. The drive recorder unit 10 may also include a serializer 13p and a deserializer 14p. The following describes an example that the drive recorder unit 10 includes the serializer 13p and the deserializer 14p.

The main microcomputer 11 is a computer including a central processing unit (CPU), a read only memory (ROM), and a random access memory (RAM), for example. The main microcomputer 11 is configured to be a System on Chip (SoC) including an image processing processor 11p and a control unit 11c, for example. The main microcomputer 11 is an example of a second control unit (or a second computer). The image processing processor 11p is an example of a video processing unit (or a hardware processor). The control unit 11c controls the image processing processor 11p.

The main microcomputer 11 can control the serializer 13m by transmitting a control signal SG3 to the serializer 13m. The main microcomputer 11 can control the deserializer 14m by transmitting a control signal SG4 to the deserializer 14m. The main microcomputer 11 controls the serializer 13p by transmitting a control signal SG1 to the serializer 13p. The main microcomputer 11 also controls the deserializer 14p by transmitting a control signal SG2 to the deserializer 14p. Specifically, the control unit 11c controls the serializer 13m, the deserializer 14m, the serializer 13p, and the deserializer 14p by transmitting respective control signals.

When a video signal SGr1 as the first video signal is transmitted from the rear camera 32, the main microcomputer 11 transmits the control signal SG4 to the deserializer 14m to cause the deserializer 14m to receive the video signal SGr1 from the rear camera 32. The video signal SGr1 received by the deserializer 14m is, for example, a serialized video signal.

Upon receiving the control signal SG4 from the main microcomputer 11, the deserializer 14m receives the video signal SGr1 transmitted from the rear camera 32. The deserializer 14m transmits the video signal SGr1 to the main microcomputer 11 and the serializer 13m. The deserializer 14m is an example of a first reception unit (or a first reception circuit). The deserializer 14m may convert the received video signal SGr1 into parallel data to be transmitted.

When a video signal SGf1 as the fourth video signal is transmitted from the front camera 31, the main microcomputer 11 transmits the control signal SG2 to the deserializer 14p to cause the deserializer 14p to receive the video signal SGf1 from the front camera 31. The video signal SGf1 received by the deserializer 14p is, for example, a serialized video signal.

Upon receiving the control signal SG2 from the main microcomputer 11, the deserializer 14p receives the video signal SGf1 transmitted from the front camera 31. The deserializer 14p transmits the video signal SGf1 to the main microcomputer 11. The deserializer 14p is an example of a second reception unit (or a second reception circuit). The deserializer 14p may convert the received video signal SGf1 into parallel data to be transmitted.

The main microcomputer 11 receives, as the video signal SGr1, the first video signal generated by the rear camera 32 from the deserializer 14m. Specifically, the image processing processor 11p receives the video signal SGr1 from the deserializer 14m. The image processing processor 11p performs the first processing on the video signal SGr1, and generates a video signal SGr2. The video signal SGr2 is an example of a second video signal as a signal for displaying the second video. The image processing processor 11p transmits the video signal SGr2 to the serializer 13m. In other words, the main microcomputer 11 transmits the video signal SGr2 to the serializer 13m. The main microcomputer 11 may convert the video signal SGr2 into parallel data to be transmitted to the serializer 13m.

The main microcomputer 11 receives the fourth video signal generated by the front camera 31 as the video signal SGf1 from the deserializer 14p. Specifically, the image processing processor 11p receives the video signal SGf1 from the deserializer 14p. The image processing processor 11p performs the second processing on the video signal SGf1, and generates a video signal SGf2. The second processing is adjustments of a color and contrast to be suitable for recording of a video outside a vehicle and display on the display 45, for example. The image processing processor 11p transmits the video signal SGf2 and the video signal SGr2 to the serializer 13p. In other words, the main microcomputer 11 transmits the video signal SGf2 and the video signal SGr2 to the serializer 13p. The main microcomputer 11 may convert the video signal SGf2 and the video signal SGr2 into parallel data to be transmitted to the serializer 13p.

The following specifically explains the first processing. The first processing includes processing of adding a signal to the first video signal. The first processing includes object detection processing, for example. The object detection processing is processing of detecting an object present around the vehicle 5 based on the first video signal, and adding an emphasis signal for emphasizing the object to the first video signal. The following specifically describes an example that the first processing includes the object detection processing. The first processing may also include processing of reducing noise appearing in an image due to bad weather. For example, the first processing may include rain erasing processing, snow erasing processing, or fog erasing processing. Specifically, when the main microcomputer 11 detects that rain, snow, or fog is present in an image generated from the first video signal, the image processing processor 11p may perform processing of causing the rain, snow, or fog to be less visible as the first processing by adjusting contrast of the first video signal. Alternatively, the first processing may include processing of depicting a road surface marking or a road sign. The road surface marking includes a road marking and a partition line. For example, in a case of determining that part of a road marking in the image generated from the first video signal is hidden, the main microcomputer 11 may perform, as the first processing, processing of adding a signal for depicting the road marking to the first video signal.

The image processing processor 11p performs image processing based on the video signal SGr1, and detects presence/absence of an object in the imaged rear video, a type of the object when the object is present, and a distance between the vehicle 5 and the object. The image processing processor 11p then adds, to the video signal SGr1, an emphasis signal for emphasizing an object to be displayed out of detected objects, which has a distance from the vehicle 5 equal to or smaller than a predetermined value. The predetermined value is, for example, 20 meters. The predetermined value may be set to be a different value depending on a type of a road on which the vehicle 5 is traveling. For example, the predetermined value may be set to be 20 meters when the vehicle 5 is traveling on an ordinary road, whereas the predetermined value may be set to be 50 meters when the vehicle 5 is traveling on an expressway. The image processing processor 11p may emphasize the detected object to be displayed only when the detected object is an object of a predetermined type. For example, the detected object to be displayed may be emphasized only when the detected object is an automobile, a two-wheeled vehicle, or a pedestrian. The image processing processor 11p may enclose the detected object with a frame line to be emphasized and displayed, for example. A method for emphasis display is not limited thereto. The first processing may include adjustments of a color and contrast.

Upon receiving the control signal SG3 from the main microcomputer 11, the serializer 13m transmits, to the display unit 20, either the video signal SGr1 received from the deserializer 14m or the video signal SGr2 received from the main microcomputer 11. For example, upon receiving the video signal SGr1 converted into parallel data from the deserializer 14m, the serializer 13m may convert the video signal SGr1 into serial data to be transmitted. For example, upon receiving the video signal SGr2 converted into parallel data from the main microcomputer 11, the serializer 13m may convert the video signal SGr2 into serial data to be transmitted. The serializer 13m is an example of a first transmission unit (or a first transmission circuit).

The video signal SGr2 and the video signal SGf2 are each stored also in the main microcomputer 11 as a recorded video. For example, the video signal SGr2 and the video signal SGf2 are stored in a RAM of the main microcomputer 11.

The drive recorder unit 10 may be able to switch between a first mode for causing the display device 25 to display the first video and a second mode for causing the display device 25 to display the second video. In a case that the drive recorder unit 10 operates in the first mode, the main microcomputer 11 controls the serializer 13m to transmit the video signal SGr1 to the display unit 20 by transmitting the control signal SG3. In a case that the drive recorder unit 10 operates in the second mode, the main microcomputer 11 controls the serializer 13m to transmit the video signal SGr2 to the display unit 20 by transmitting the control signal SG3.

The main microcomputer 11 controls the serializer 13p to transmit the video signal SGr2 and the video signal SGf2 to the display unit 40 by transmitting the control signal SG1.

Upon receiving the control signal SG1 from the main microcomputer 11, the serializer 13p transmits, to the display unit 40, the video signal SGr2 received from the main microcomputer 11 and the video signal SGf2 received from the main microcomputer 11. For example, upon receiving the video signal SGr2 converted into parallel data from the main microcomputer 11, the serializer 13$p$ may convert the video signal SGr2 into serial data to be transmitted. For example, upon receiving the video signal SGf2 converted into parallel data from the main microcomputer 11, the serializer 13$p$ may convert the video signal SGf2 into serial data to be transmitted. The serializer 13$p$ is an example of a second transmission unit (or a second transmission circuit).

Transmission of the control signal SG1 to the serializer 13$p$, transmission of the control signal SG2 to the deserializer 14$p$, transmission of the control signal SG3 to the serializer 13$m$, and transmission of the control signal SG4 to the deserializer 14$m$ from the main microcomputer 11 are each performed in an Inter-Integrated Circuit (I2C) format, for example.

Transmission of the video signal SGf1 to the main microcomputer 11 from the deserializer 14$p$, transmission of the video signal SGf2 to the serializer 13$p$ from the main microcomputer 11, transmission of the video signal SGr1 to the main microcomputer 11 from the deserializer 14$m$, and transmission of the video signal SGr2 to the serializer 13$m$ from the main microcomputer 11 are each performed in a Mobile Industry Processor Interface (MIPI) format, for example.

Transmission of the video signal SGr1 to the deserializer 14$m$ from the rear camera 32, transmission of the video signal SGr1 and the video signal SGr2 to the display unit 20 from the serializer 13$m$, transmission of the video signal SGf1 to the deserializer 14$p$ from the front camera 31, and transmission of the video signal SGr2 and the video signal SGf2 to the display unit 40 from the serializer 13$p$ are each performed in a Flat Panel Display-Link III (FPD-Link III) format, for example.

Such video transmission may be performed by wired communication or wireless communication. For example, video transmission may be performed by wired communication using a coaxial cable. For example, video transmission may be performed by wireless communication using Wi-Fi (registered trademark).

The display unit 40 includes the display 45. The display unit 40 is, for example, configured as part of In-Vehicle Infotainment (IVI) system.

The display unit 40 transmits the received video signal SGr2 and video signal SGf2 to the display 45. The display 45 can display the third video and the fourth video based on the received video signal SGr2 and video signal SGf2. The third video and the fourth video can be used, for example, for displaying a circumstance outside the vehicle in parking support, displaying a parking space, displaying a parking route, and the like.

The display unit 20 includes the display device 25. The display unit 20 may also include an electronic control unit (ECU) 21. The following describes an example that the display unit 20 includes the ECU 21.

The display unit 20 transmits the received video signal SGr1 or video signal SGr2 to the ECU 21. The ECU 21 performs video processing on the video signal SGr1 or the video signal SGr2. The video processing is adjustments of a color and contrast to be suitable for display on the display device 25, for example.

The video signal SGr1 or the video signal SGr2, on which the video processing has been performed by the ECU 21, is passed to the display device 25. The display device 25 displays the first video as a video that is generated based on the video signal SGr1, or the second video as a video that is generated based on the video signal SGr2. The first video and the second video are used for checking on an area behind the vehicle 5, for example.

The display unit 20 may be able to directly receive the video signal SGr1 from the rear camera 32.

Processing Example of Drive Recorder Unit

Figure 3:
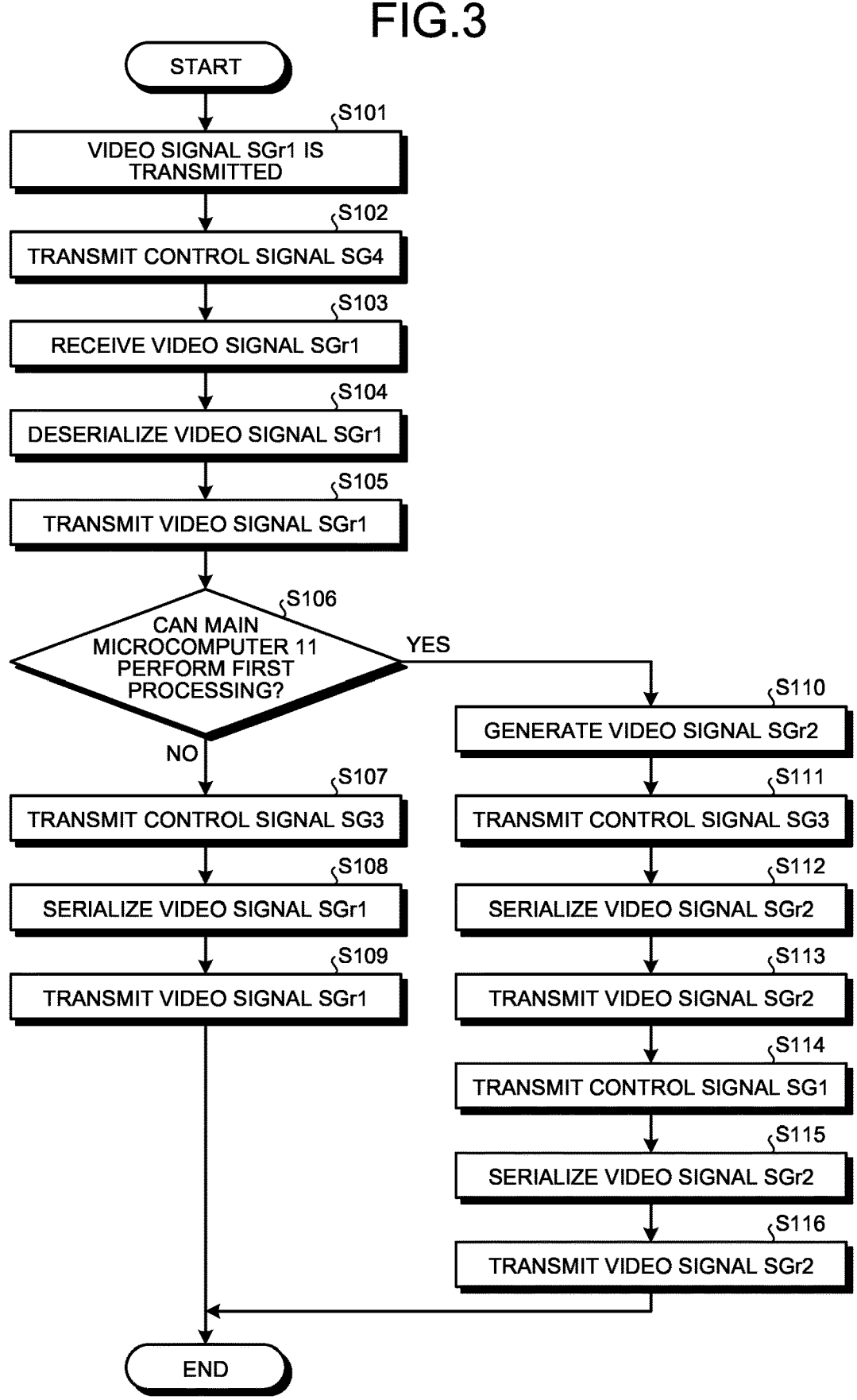
FIG. 3 is a flowchart illustrating an example of a processing procedure performed by the drive recorder unit according to the first embodiment.

Next, the following describes an example of processing performed by the drive recorder unit 10 according to the first embodiment with reference to FIG. 3. FIG. 3 is a flowchart illustrating an example of a processing procedure performed by the drive recorder unit 10 according to the first embodiment. The following describes only processing for the video signal generated by the rear camera 32.

As illustrated in FIG. 3, when the video signal SGr1 is transmitted to the drive recorder unit 10 from the rear camera 32 (Step S101), the main microcomputer 11 transmits, as the control signal SG4 to the deserializer 14$m$, a command to receive the video signal SGr1 (Step S102).

Upon receiving the control signal SG4, the deserializer 14$m$ receives the video signal SGr1 from the rear camera 32 (Step S103). The deserializer 14$m$ deserializes the video signal SGr1 to convert into parallel data (Step S104). The deserializer 14$m$ transmits the video signals SGr1 converted into the parallel data to the main microcomputer 11 and the serializer 13$m$ (Step S105).

At this point, the following processing branches depending on whether the main microcomputer 11 can perform the first processing (Step S106). The state that the main microcomputer 11 can perform the first processing refers to a state that the image processing processor 11$p$ is started up. The image processing processor 11$p$ is started up when a predetermined time has elapsed from when the main microcomputer 11 is started up, for example. Even in a case that the main microcomputer 11 cannot perform the first processing, Step S102 and Step S107 (described later) can be performed so long as the serializer 13$m$, the deserializer 14$m$, the serializer 13$p$, and the deserializer 14$p$ can be controlled.

In a case that the main microcomputer 11 cannot perform the first processing (No at Step S106), the main microcomputer 11 performs processing of causing the drive recorder unit 10 to operate in the first mode. Specific processing will be described below. The main microcomputer 11 transmits, as the control signal SG3 to the serializer 13$m$, a command to transmit the video signal SGr1 (Step S107).

Upon receiving the control signal SG3, the serializer 13$m$ serializes the video signal SGr1 received from the deserializer 14$m$ (Step S108). The serializer 13$m$ transmits the serialized video signal SGr1 to the display unit 20 (Step S109).

In a case that the main microcomputer 11 can perform the first processing (Yes at Step S106), the main microcomputer 11 performs processing of causing the drive recorder unit 10 to operate in the second mode. Specific processing will be described below. The main microcomputer 11 receives the video signal SGr1 from the deserializer 14$m$. The image processing processor 11$p$ performs the first processing on the video signal SGr1, and generates the video signal SGr2 (Step S110).

The main microcomputer 11 transmits the video signal SGr2 to the serializer 13$m$. The main microcomputer 11 transmits, as the control signal SG3 to the serializer 13$m$, a command to transmit the video signal SGr2 (Step S111).

Upon receiving the control signal SG3, the serializer 13$m$ serializes the video signal SGr2 received from the main microcomputer 11 (Step S112). The serializer 13*m* transmits the serialized video signal SGr2 to the display unit 20 (Step S113).

The main microcomputer 11 transmits the video signal SGr2 to the serializer 13*p*. The main microcomputer 11 transmits, as the control signal SG1 to the serializer 13*p*, the command to transmit the video signal SGr2 (Step S114).

Upon receiving the control signal SG1, the serializer 13*p* serializes the video signal SGr2 received from the main microcomputer 11 (Step S115). The serializer 13*p* transmits the serialized video signal SGr2 to the display unit 40 (Step S116).

The processing at Steps S111 to S113 and the processing at Steps S114 to S116 described above may be performed in parallel.

Accordingly, the processing performed by the drive recorder unit 10 according to the embodiment ends.

The switching from the first mode to the second mode may be performed at a first time point at which the main microcomputer 11 is allowed to perform the first processing, or may be performed later than the first time point. For example, the switching from the first mode to the second mode may be performed at a second time point during a stop of the vehicle 5, which is later than the first time point. With such switching, a video displayed on the display device 25 is not switched during traveling, so that a driver's attention is hardly attracted by switching of the video. Therefore, safety in vehicle traveling can be further secured. For example, the main microcomputer 11 may receive velocity information of the vehicle 5 from a controller area network (CAN), and, when a velocity of the vehicle 5 is equal to or smaller than a certain velocity, the main microcomputer 11 may determine that the vehicle 5 is being stopped and then switch over to the second mode. Alternatively, the main microcomputer 11 may include an acceleration sensor, and, when acceleration of the vehicle 5 is equal to or smaller than certain acceleration, the main microcomputer 11 may determine that the vehicle 5 is being stopped and then switch over to the second mode.

The switching from the first mode to the second mode, or the switching from the second mode to the first mode may be automatically performed by the main microcomputer 11, or may be performed by user's operation. For example, at a timing when switching to the second mode is enabled when the drive recorder unit 10 is operating in the first mode, a user may be notified that switching to the second mode can be performed, and the main microcomputer 11 may switch the mode to the second mode at a timing upon receiving an instruction to switch the mode to the second mode from the user.

At the time when the first mode is switched to the second mode, or when the second mode is switched to the first mode, a black screen may be displayed on the display device 25. In switching the video displayed on the display device 25 from the first video to the second video, or from the second video to the first video, the video may be disturbed. By changing the video displayed on the display device 25 from the first video to the black screen first, and switching the black screen to the second video thereafter, it is possible to prevent a disturbed video from being displayed on the display device 25.

At the time when the first mode is switched to the second mode, or when the second mode is switched to the first mode, the video that has been displayed immediately before the switching may be displayed on the display device 25. For example, after displaying the video that has been displayed immediately before switching from the first mode to the second mode on the display device 25 as a static image for a certain period of time, and the mode may be switched to the second mode. The certain period of time is a time equivalent to a period during which distortion of the video may occur, or is a time longer than this period. The certain period of time is, for example, 50 milliseconds. Due to this, it is also possible to prevent a disturbed video from being displayed on the display device 25.

Advantage of First Embodiment

The drive recorder unit 10 according to the present embodiment is able to switch the video to be displayed on the display device 25 depending on whether the main microcomputer 11 can perform the first processing.

In some cases, a certain time may be required from when the main microcomputer 11 is started up until the main microcomputer 11 is enabled to perform the first processing. If the video is not displayed on the display device 25 in a period from when the main microcomputer 11 is started up until the first processing is started, it is difficult for a driver to check on an area behind the vehicle 5 by using the display device 25, so that the driver suffers inconvenience.

The drive recorder unit 10 according to the present embodiment can cause the display device 25 to display the first video in a situation that the main microcomputer 11 cannot perform the first processing. After that, when the main microcomputer 11 is enabled to perform the first processing, the display device 25 can display the second video generated by performing the first processing. With this processing, the video subjected to image processing can be displayed at a desired timing while maintaining display of a video on the display device 25. Additionally, the display device 25 can be easily caused to conform to a safety standard of United Nations-Regulation 46 (UN-R46). The safety standard of UN-R46 prescribes that a display device should display a video within a predetermined time from start-up.

Second Embodiment

A drive recorder unit 10A according to a second embodiment is different from the drive recorder unit 10 according to the first embodiment in that, the drive recorder unit 10A includes a sub-microcomputer 12. The following describes the drive recorder unit 10A with reference to FIG. 4 and FIG. 5. The same configuration and operation as the configuration and the operation described in the first embodiment are denoted by the same reference numerals, and description thereof will be omitted or simplified.

Figure 4:
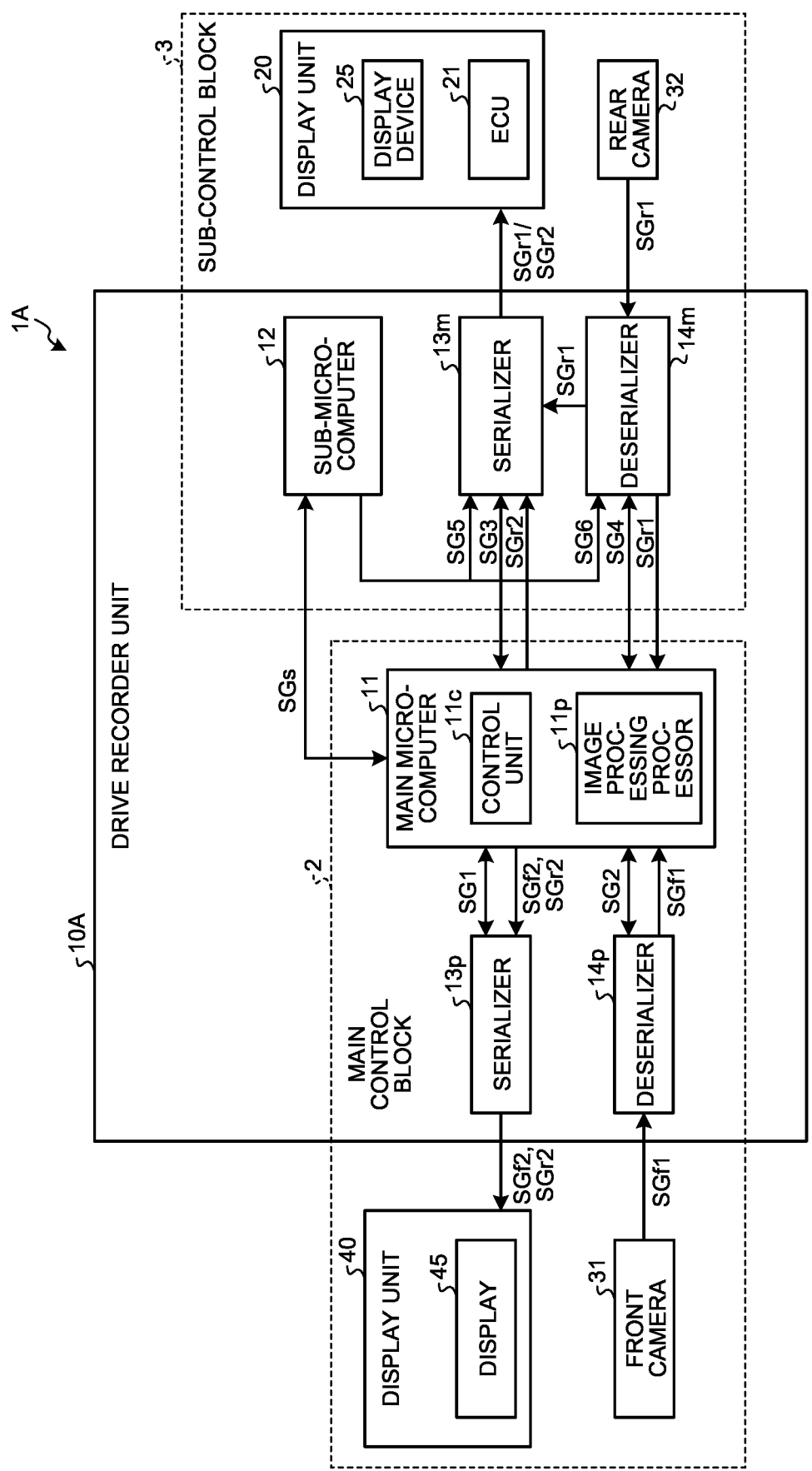
FIG. 4 is a block diagram illustrating an example of a configuration of a video processing system according to a second embodiment.

FIG. 4 is a block diagram illustrating an example of a configuration of a video processing system 1A according to the second embodiment.

The drive recorder unit 10A includes the main microcomputer 11, the sub-microcomputer 12, the serializer 13*m*, and the deserializer 14*m*. The drive recorder unit 10 may also include the serializer 13*p* and the deserializer 14*p*. The following describes an example that the drive recorder unit 10A includes the serializer 13*p* and the deserializer 14*p*.

The sub-microcomputer 12 is a computer including a CPU, a ROM, and a RAM. The sub-microcomputer 12 is configured as a micro controller unit (MCU), for example. The sub-microcomputer 12 is an example of a first control unit (or a first computer).

The main microcomputer 11 and the sub-microcomputer 12 can operate independent of each other. Thus, for example, even if a certain failure occurs in the main microcomputer 11, the sub-microcomputer 12 can continuously operate. Accordingly, for example, the display device 25 continuously displays the video.

A time required for start-up of the sub-microcomputer 12 may be shorter than that for the main microcomputer 11. It may take much time for start-up of the main microcomputer 11 because the main microcomputer 11 has a recording function and an image processing function, for example. For example, even in a case that the main microcomputer 11 is not started up yet, the sub-microcomputer 12 can cause the display device 25 to continuously display the video if the sub-microcomputer 12 is started up.

The sub-microcomputer 12 controls the serializer 13m by transmitting a control signal SG5 to the serializer 13m. The sub-microcomputer 12 also controls the deserializer 14m by transmitting a control signal SG6 to the deserializer 14m.

Transmission of the control signal SG5 from the sub-microcomputer 12 to the serializer 13m, and transmission of the control signal SG6 to the deserializer 14m are each performed in the I2C format, for example.

The sub-microcomputer 12 notifies the main microcomputer 11 of status information by transmitting a status signal SGs to the main microcomputer 11. The main microcomputer 11 notifies the sub-microcomputer 12 of the status information by transmitting the status signal SGs to the sub-microcomputer 12. The status information includes information about whether the main microcomputer 11 can perform the first processing. The status information may include, for example, information about at least one of a status of the main microcomputer 11, a status of the sub-microcomputer 12, whether a failure occurs in a main control block 2 (described later), and whether a failure occurs in a sub-control block 3 (described later).

Transmission and reception of the status signal SGs between the main microcomputer 11 and the sub-microcomputer 12 are performed in a UART format, for example.

The drive recorder unit 10A may be able to switch between the first mode for causing the display device 25 to display the first video and the second mode for causing the display device 25 to display the second video. In a case that the drive recorder unit 10A operates in the first mode, the sub-microcomputer 12 controls the serializer 13m to transmit the video signal SGr1 to the display unit 20 by transmitting the control signal SG5. In a case that the drive recorder unit 10A operates in the second mode, the main microcomputer 11 controls the serializer 13m to transmit the video signal SGr2 to the display unit 20 by transmitting the control signal SG3.

When the video signal SGr1 as the first video signal is transmitted from the rear camera 32, the sub-microcomputer 12 transmits the control signal SG6 to the deserializer 14m to cause the deserializer 14m to receive the video signal SGr1 from the rear camera 32.

Upon receiving the control signal SG6 from the sub-microcomputer 12, the deserializer 14m receives the video signal SGr1 transmitted from the rear camera 32. The deserializer 14m transmits the video signals SGr1 to the main microcomputer 11 and the serializer 13m. The deserializer 14m may transmit the video signal SGr1 to the serializer 13m alone.

Upon receiving the control signal SG3 from the sub-microcomputer 12, the serializer 13m transmits, to the display unit 20, the video signal SGr1 which has been received from the deserializer 14m.

The main microcomputer 11, the serializer 13p, the deserializer 14p, the front camera 31, and the display unit 40 constitute a main control block 2. In the main control block 2, the serializer 13p, the deserializer 14p, the front camera 31, and the display unit 40 are managed by the main microcomputer 11.

The sub-microcomputer 12, the serializer 13m, the deserializer 14m, the rear camera 32, and the display unit 20 constitute a sub-control block 3. In the sub-control block 3, the serializer 13m, the deserializer 14m, the rear camera 32, and the display unit are managed by the sub-microcomputer 12.

The main control block 2 and the sub-control block 3 can operate independent of each other. Thus, even if a certain failure occurs in the main control block 2, for example, the sub-control block 3 can continuously operate. The sub-control block 3 continuously operates, so that the display device 25 can continuously display the rear video, for example.

Processing Example of Drive Recorder Unit

Figure 5:
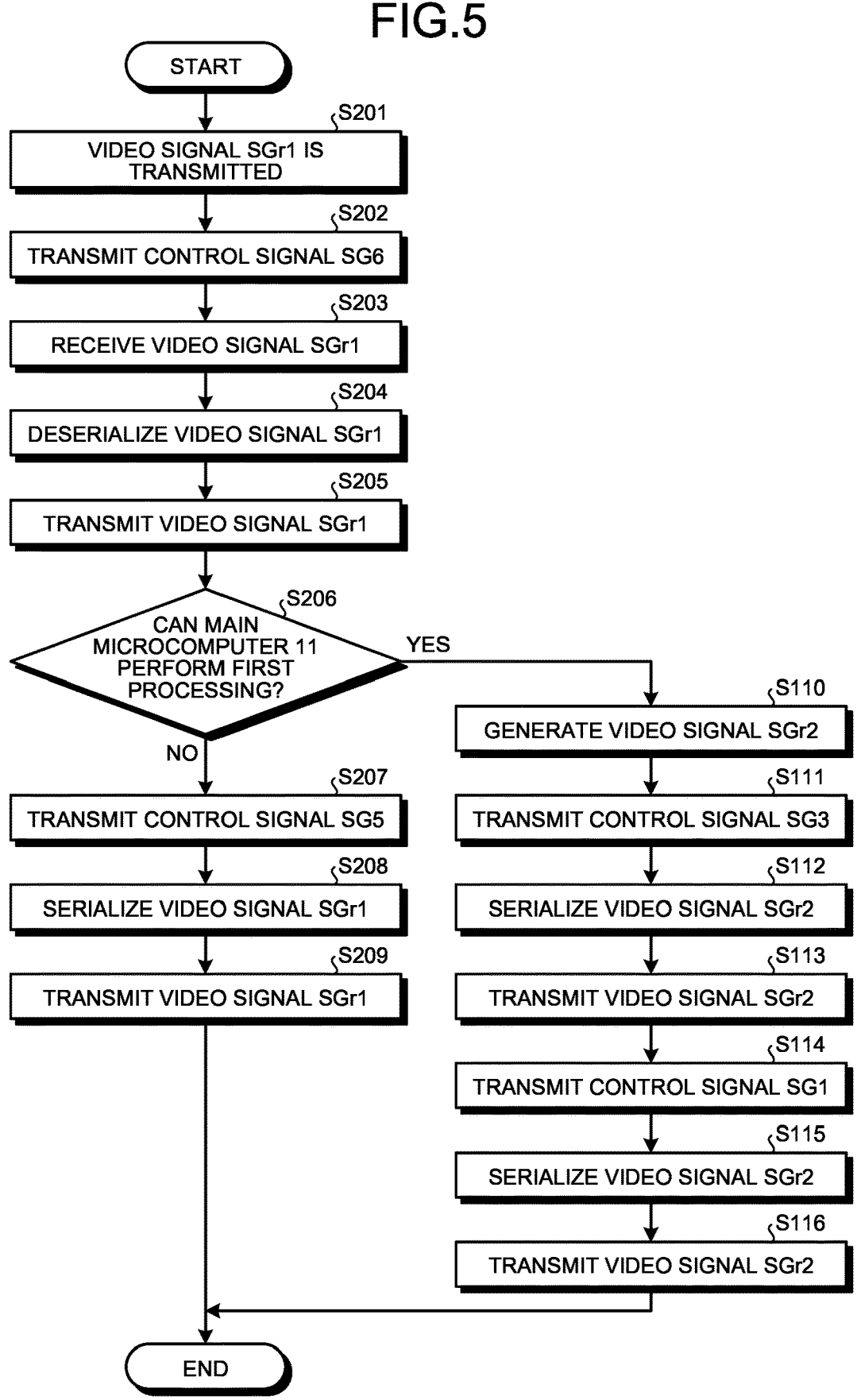
FIG. 5 is a flowchart illustrating an example of a processing procedure performed by a drive recorder unit according to the second embodiment.

Next, the following describes an example of processing performed by the drive recorder unit 10A according to the second embodiment with reference to FIG. 5. FIG. 5 is a flowchart illustrating an example of a processing procedure performed by the drive recorder unit 10A according to the second embodiment. The following describes only processing for the video signal generated by the rear camera 32.

As illustrated in FIG. 5, when the video signal SGr1 is transmitted to the drive recorder unit 10A from the rear camera 32 (Step S201), the sub-microcomputer 12 transmits, as the control signal SG6 to the deserializer 14m, a command to receive the video signal SGr1 (Step S202).

Upon receiving the control signal SG6, the deserializer 14m receives the video signal SGr1 from the rear camera 32 (Step S203). The deserializer 14m deserializes the video signal SGr1 to convert into parallel data (Step S204). The deserializer 14m transmits the video signals SGr1 converted into the parallel data to the main microcomputer 11 and the serializer 13m (Step S205).

At this point, the following processing branches depending on whether the main microcomputer 11 can perform the first processing (Step S206). The state that the main microcomputer 11 can perform the first processing refers to a state that a predetermined time has elapsed from start-up of the main microcomputer 11. The sub-microcomputer 12 receives, as the status signal SGs, a status indicating whether the main microcomputer 11 can perform the first processing from the main microcomputer 11.

In a case that the main microcomputer 11 cannot perform the first processing (No at Step S206), the sub-microcomputer 12 performs processing of causing the drive recorder unit 10A to operate in the first mode. Specific processing will be described below. The sub-microcomputer 12 transmits, as the control signal SG5 to the serializer 13m, a command to transmit the video signal SGr1 (Step S207).

Upon receiving the control signal SG5, the serializer 13m serializes the video signal SGr1 received from the deserializer 14m (Step S208). The serializer 13m transmits the serialized video signal SGr1 to the display unit 20 (Step S209).

In a case that the main microcomputer 11 can perform the first processing (Yes at Step S206), the main microcomputer 11 performs processing of causing the drive recorder unit 10A to operate in the second mode. The following processing is the same as Step S110 to Step S116 in the first embodiment.

The processing performed by the drive recorder unit 10A ends.

In a case that a failure in the main control block 2 is detected, the switching from the second mode to the first mode may be performed. The case that a failure in the main control block 2 is detected refers to a case that a failure in the main microcomputer 11 is detected, for example. At this point, the sub-microcomputer 12 receives, as the status signal SGs, a status indicating that a failure occurs in the main control block 2 from the main microcomputer 11. However, in a case that a failure occurs in the main microcomputer 11 itself, for example, the status signal SGs is not necessarily transmitted from the main microcomputer 11. The processing at Steps S102 to S105 described above is performed by the sub-microcomputer 12 irrespective of whether the main control block 2 including the main microcomputer 11 is normally operating.

Advantage of Second Embodiment

The same advantage as that in the first embodiment can also be achieved in the present embodiment. The drive recorder unit 10A according to the second embodiment includes the main microcomputer 11 and the sub-microcomputer 12 that operate independent of each other. In a case that the sub-microcomputer 12 is started up earlier than the main microcomputer 11, the sub-microcomputer 12 can start to display the video on the display device 25 even in a case that the main microcomputer 11 is not started up. Therefore, the display device 25 can be easily caused to conform to the safety standard of UN-R46.

The drive recorder unit 10A according to the present embodiment includes the elements belonging to the main control block 2 and the elements belonging to the sub-control block 3, which operate independent of each other. With this configuration, even in a case that a failure occurs in the configuration belonging to the main control block 2, the sub-control block 3 continuously operates, so that the display device 25 can continuously display the video. Thus, the display device 25 can be easily caused to conform to the safety standard of UN-R46.

Third Embodiment

A drive recorder unit 10B according to a third embodiment is different from the drive recorder unit 10 according to the first embodiment in that, the image processing processor 11p transmits a first signal SGd1 instead of the video signal SGr2. The following describes the drive recorder unit 10B with reference to FIG. 6 and FIG. 7. The same configuration and operation as the configuration and the operation described in the first embodiment and the second embodiment are denoted by the same reference numerals, and description thereof will be omitted or simplified.

Configuration Example of Video Processing System

Figure 6:
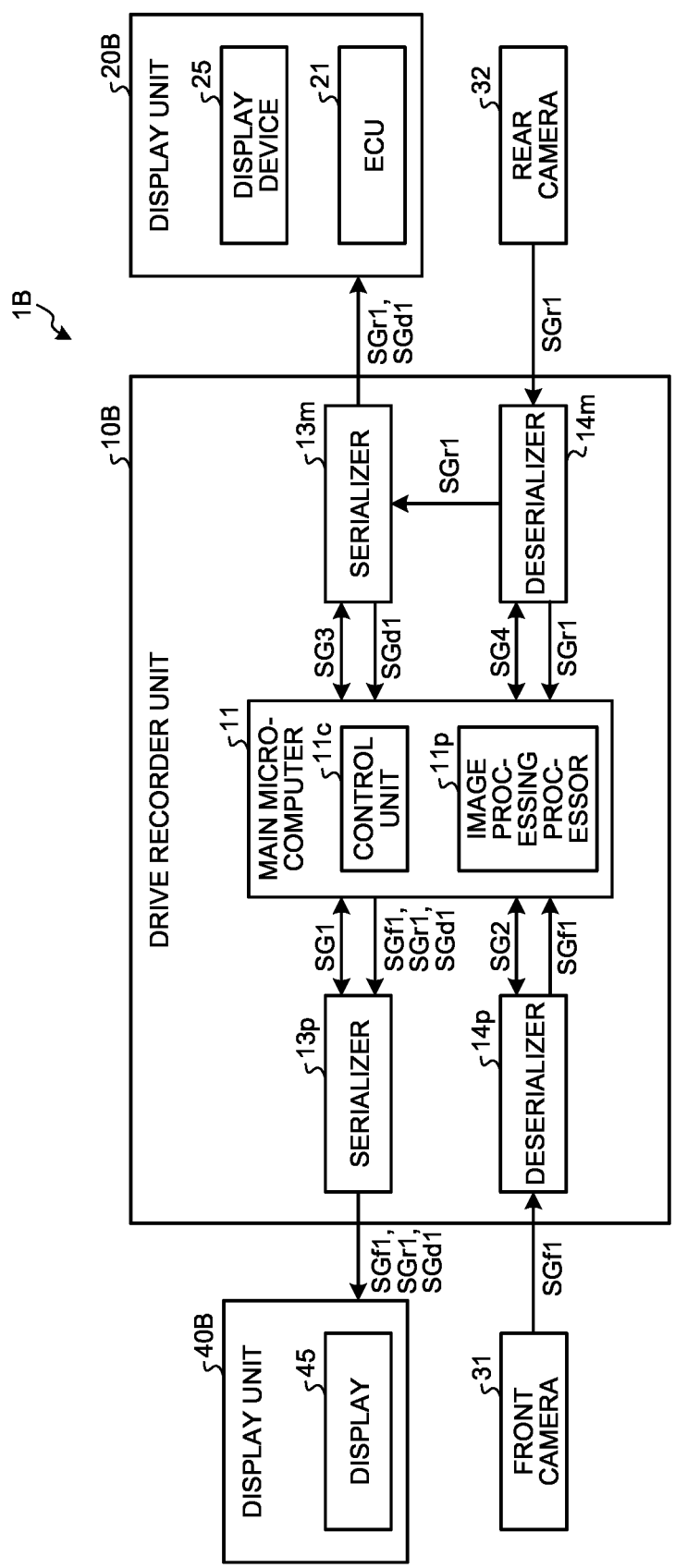
FIG. 6 is a block diagram illustrating an example of a configuration of a video processing system according to a third embodiment.

FIG. 6 is a block diagram illustrating an example of a configuration of a video processing system 1B according to the third embodiment. As illustrated in FIG. 6, the video processing system 1B according to the third embodiment includes the drive recorder unit 10B, a display unit 20B, and the rear camera 32. The video processing system 1B may also include a display unit 40B.

In the present embodiment, the drive recorder unit 10B generates a first signal based on the first video signal received from the rear camera 32. The drive recorder unit 10B may detect, for example, an object present around the vehicle 5 based on the first video signal and generate an emphasis signal for emphasizing the object as the first signal.

The drive recorder unit 10B includes the main microcomputer 11, the serializer 13m, and the deserializer 14m. The drive recorder unit 10B may also include the serializer 13p and the deserializer 14p. The following describes an example that the drive recorder unit 10B includes the serializer 13p and the deserializer 14p.

In the present embodiment, the image processing processor 11p generates the first signal SGd1 based on the video signal SGr1 instead of generating the video signal SGr2. The first signal SGd1 is an example of the first signal. The video signal SGr2 is obtained by adding the first signal SGd1 to the video signal SGr1. Generation of the video signal SGr2 in the present embodiment will be described later. The image processing processor 11p transmits the first signal SGd1 to the serializer 13m. In other words, the main microcomputer 11 transmits the first signal SGd1 to the serializer 13m. The main microcomputer 11 may convert the first signal SGd1 into parallel data to be transmitted to the serializer 13m.

The following specifically describes the first signal. As explained in the foregoing first embodiment, the first signal is a signal to be added to the first video signal in the first processing. For example, upon detecting an object present around the vehicle 5 based on the first video signal, the image processing processor 11p generates, as the first signal, an emphasis signal for emphasizing the object. The following specifically describes an example that the first signal is the emphasis signal. The first signal may include a signal for performing processing of reducing noise appearing in an image due to bad weather. For example, the first signal may include a signal for performing rain erasing processing, snow erasing processing, or fog erasing processing. Specifically, when the main microcomputer 11 detects that rain, snow, or fog is present in the image generated from the first video signal, the image processing processor 11p may generate, as the first signal, a signal that can adjust contrast of the first video signal by being added to the first video signal to cause the rain, snow, or fog to be less visible. Alternatively, the first signal may include a signal for depicting a road surface marking or a road sign. For example, in a case of determining that part of a road marking in the image generated from the first video signal is hidden, the main microcomputer 11 may generate a signal for depicting the road marking as the first signal.

The image processing processor 11p performs image processing based on the video signal SGr1 and detects presence/absence of an object in the imaged rear video, a type of the object in a case that the object is present, and a distance between the vehicle 5 and the object. The image processing processor 11p then generates, as the first signal SGd1, the emphasis signal that emphasizes the object to be displayed having a distance from the vehicle 5 equal to or smaller than a predetermined value among detected objects. The predetermined value is, for example, 20 meters. The predetermined value may be set to be a different value depending on a type of a road on which the vehicle 5 is traveling. For example, the predetermined value may be set to be 20 meters in a case that the vehicle 5 is traveling on an ordinary road, whereas the predetermined value may be set to be 50 meters in a case that the vehicle 5 is traveling on an expressway. When a plurality of objects having a distance from the vehicle 5 equal to or smaller than the predetermined value are detected, the image processing processor 11p may generate the first signal SGd1 for emphasizing and displaying only the object having a smaller distance from the vehicle 5 instead of emphasizing and displaying all of the objects. The image processing processor 11p may generate the first signal SGd1 as the emphasis signal for emphasizing and displaying the detected object only when the detected object is an object of a predetermined type. For example, the first signal SGd1 may be generated only when the detected object is an automobile, a two-wheeled vehicle, or a pedestrian. The first signal SGd1 may be, for example, the emphasis signal for emphasizing and displaying the detected object by enclosing the detected object with a frame line. Alternatively, the first signal SGd1 may be the emphasis signal for emphasizing and displaying the detected object by indicating a position of the detected object. For example, when a vehicle positioned on a right side of the vehicle 5 is detected, the first signal SGd1 may be the emphasis signal for displaying an icon of a vehicle on the right side. The method for emphasized display is not limited thereto. The first signal SGd1 may include a signal for adjusting a color and contrast.

Upon receiving the control signal SG3 from the main microcomputer 11, the serializer 13m transmits the video signal SGr1 received from the deserializer 14m alone, or the video signal SGr1 and the first signal SGd1 received from the main microcomputer 11 to the display unit 20B.

The drive recorder unit 10B may be able to switch between the first mode for causing the display device 25 to display the first video and the second mode for causing the display device 25 to display the second video. In a case that the drive recorder unit 10B operates in the first mode, the main microcomputer 11 controls the serializer 13m to transmit the video signal SGr1 to the display unit 20B by transmitting the control signal SG3. In a case that the drive recorder unit 10B operates in the second mode, the main microcomputer 11 controls the serializer 13m to transmit the video signal SGr1 and the first signal SGd1 to the display unit 20B by transmitting the control signal SG3.

The main microcomputer 11 controls the serializer 13p to transmit the video signal SGr1, the first signal SGd1, and the video signal SGf2 to the display unit 40B by transmitting the control signal SG1.

Upon receiving the control signal SG1 from the main microcomputer 11, the serializer 13p transmits, to the display unit 40B, the video signal SGr1 and the first signal SGd1 received from the main microcomputer 11, and the video signal SGf2 received from the main microcomputer 11. Upon receiving the video signal SGr1 converted into parallel data from the main microcomputer 11, the serializer 13p may convert the video signal SGr1 into serial data to be transmitted.

Transmission of the video signal SGr1 from the main microcomputer 11 to the serializer 13m is performed in the MIPI format, for example.

Transmission of the first signal SGd1 from the main microcomputer 11 to the serializer 13m is performed in the I2C format, for example.

Transmission of the video signal SGr1 from the serializer 13p to the display unit 40B, and transmission of the first signal SGd1 from the serializer 13m to the display unit 20B are each performed in the FPD-Link III format, for example.

Such video transmission may be performed by wired communication or wireless communication. For example, video transmission may be performed by wired communication using a coaxial cable. For example, video transmission may be performed by wireless communication using Wi-Fi (registered trademark).

The video signal SGr1, or the video signal SGr1 and the first signal SGd1 is/are received by the ECU 21. The ECU 21 corresponds to a video signal generation unit (or a control device). The ECU 21 generates the video signal SGr2 by adding the first signal SGd1 to the video signal SGr1. The ECU 21 performs video processing on the video signal SGr1 or the video signal SGr2. The video processing is adjustments of a color and contrast to be suitable for display on the display device 25, for example.

The video signal SGr1 or the video signal SGr2, on which the video processing has been performed by the ECU 21, is passed to the display device 25. The display device 25 displays the first video as a video that is generated based on the video signal SGr1, or the second video as a video that is generated based on the video signal SGr2. The first video and the second video are used for checking on an area behind the vehicle 5, for example.

The display unit 40B may include a video signal generation unit. In a case that the display unit 40B includes the video signal generation unit, the display unit 40B transmits the received video signal SGr1, first signal SGd1, and video signal SGf2 to the video signal generation unit. The video signal generation unit generates the video signal SGr2 by adding the first signal SGd1 to the video signal SGr1.

The video signal generation unit transmits the video signal SGr2 and the video signal SGf2 to the display 45. The display 45 can display the third video and the fourth video based on the received video signal SGr2 and video signal SGf2.

Processing Example of Drive Recorder Unit

Figure 7:
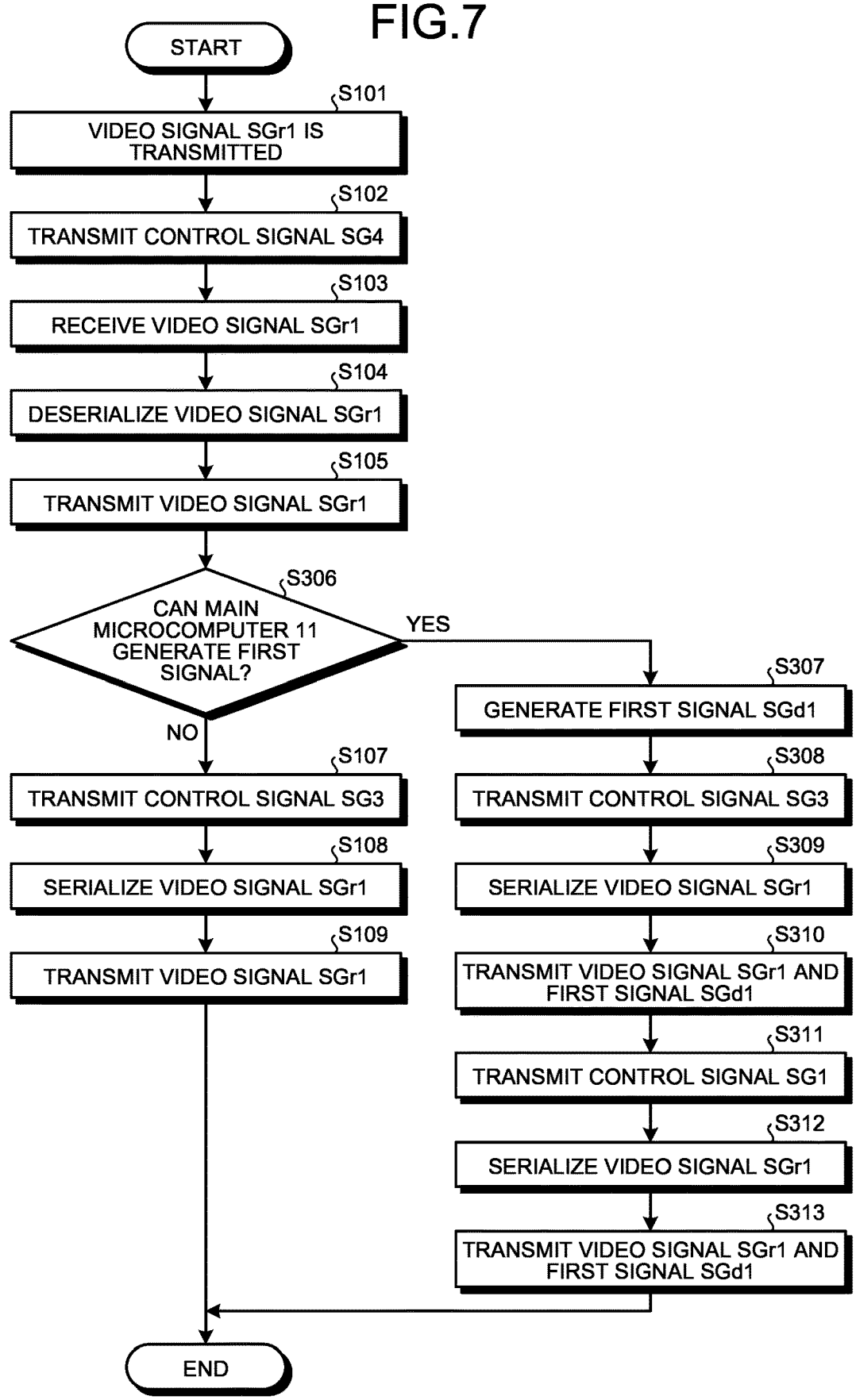
FIG. 7 is a flowchart illustrating an example of a processing procedure performed by a drive recorder unit according to the third embodiment.

Next, the following describes an example of processing performed by the drive recorder unit 10B according to the third embodiment with reference to FIG. 7. FIG. 7 is a flowchart illustrating an example of a processing procedure performed by the drive recorder unit 10B according to the third embodiment. The following describes only processing for the video signal generated by the rear camera 32.

Step S101 to Step S105 are the same as those in the foregoing first embodiment, so that description thereof is omitted.

At Step S306, the following processing branches depending on whether the main microcomputer 11 can generate the first signal. The state that the main microcomputer 11 can generate the first signal refers to a state that the image processing processor 11p is started up. The image processing processor 11p is started up when a predetermined time has elapsed from start-up of the main microcomputer 11, for example. Even in a case that the main microcomputer 11 cannot generate the first signal, Step S102 and Step S107 (described later) can be performed so long as the serializer 13m, the deserializer 14m, the serializer 13p, and the deserializer 14p can be controlled.

In a case that the main microcomputer 11 cannot generate the first signal (No at Step S306), the main microcomputer 11 performs processing of causing the drive recorder unit 10B to operate in the first mode. Specifically, processes at Step S107 to Step S109 are performed. Step S107 to Step S109 are the same as those in the first embodiment, so that description thereof is omitted.

In a case that the main microcomputer 11 can generate the first signal (Yes at Step S306), the main microcomputer 11 performs processing of causing the drive recorder unit 10B to operate in the second mode. Specific processing is described below. The main microcomputer 11 receives the video signal SGr1 from the deserializer 14m. The image processing processor 11p generates the first signal SGd1 based on the video signal SGr1 (Step S307).

The main microcomputer 11 transmits the first signal SGd1 to the serializer 13m. The main microcomputer 11 also transmits, as the control signal SG3 to the serializer 13m, a command to transmit the video signal SGr1 and the first signal SGd1 (Step S308).

Upon receiving the control signal SG3, the serializer 13m serializes the video signal SGr1 received from the deserializer 14m (Step S309). The serializer 13m transmits the serialized video signal SGr1 and the first signal SGd1 to the display unit 20B (Step S310).

The main microcomputer 11 also transmits the video signal SGr1 and the first signal SGd1 to the serializer 13p. The main microcomputer 11 transmits, as the control signal SG1 to the serializer 13p, a command to transmit the video signal SGr1 and the first signal SGd1 (Step S311).

Upon receiving the control signal SG1, the serializer 13p serializes the video signal SGr1 received from the main microcomputer 11 (Step S312). The serializer 13p transmits the serialized video signal SGr1 and first signal SGd1 to the display unit 40 (Step S313).

The processing at Steps S308 to S310 and the processing at Steps S311 to S313 described above may be performed in parallel.

The processing performed by the drive recorder unit 10B according to the embodiment ends.

Advantage of Third Embodiment

The same advantage as that in the first embodiment can also be obtained in the present embodiment. In addition, in the present embodiment, the image processing processor 11p transmits the first signal SGd1 instead of the video signal SGr2. That is, the number of video outputs from the image processing processor 11p can be reduced as compared with the first embodiment. Therefore, an inexpensive processor whose number of video outputs is small can be used as the image processing processor 11p.

Fourth Embodiment

A drive recorder unit 10C according to a fourth embodiment is different from the drive recorder unit 10B according to the third embodiment in that, the drive recorder unit 10C includes the sub-microcomputer 12. The following describes the drive recorder unit 10C with reference to FIG. 8 and FIG. 9. The same configuration and operation as the configuration and the operation described in the first embodiment to the third embodiment are denoted by the same reference numerals, and description thereof will be omitted or simplified.

Figure 8:
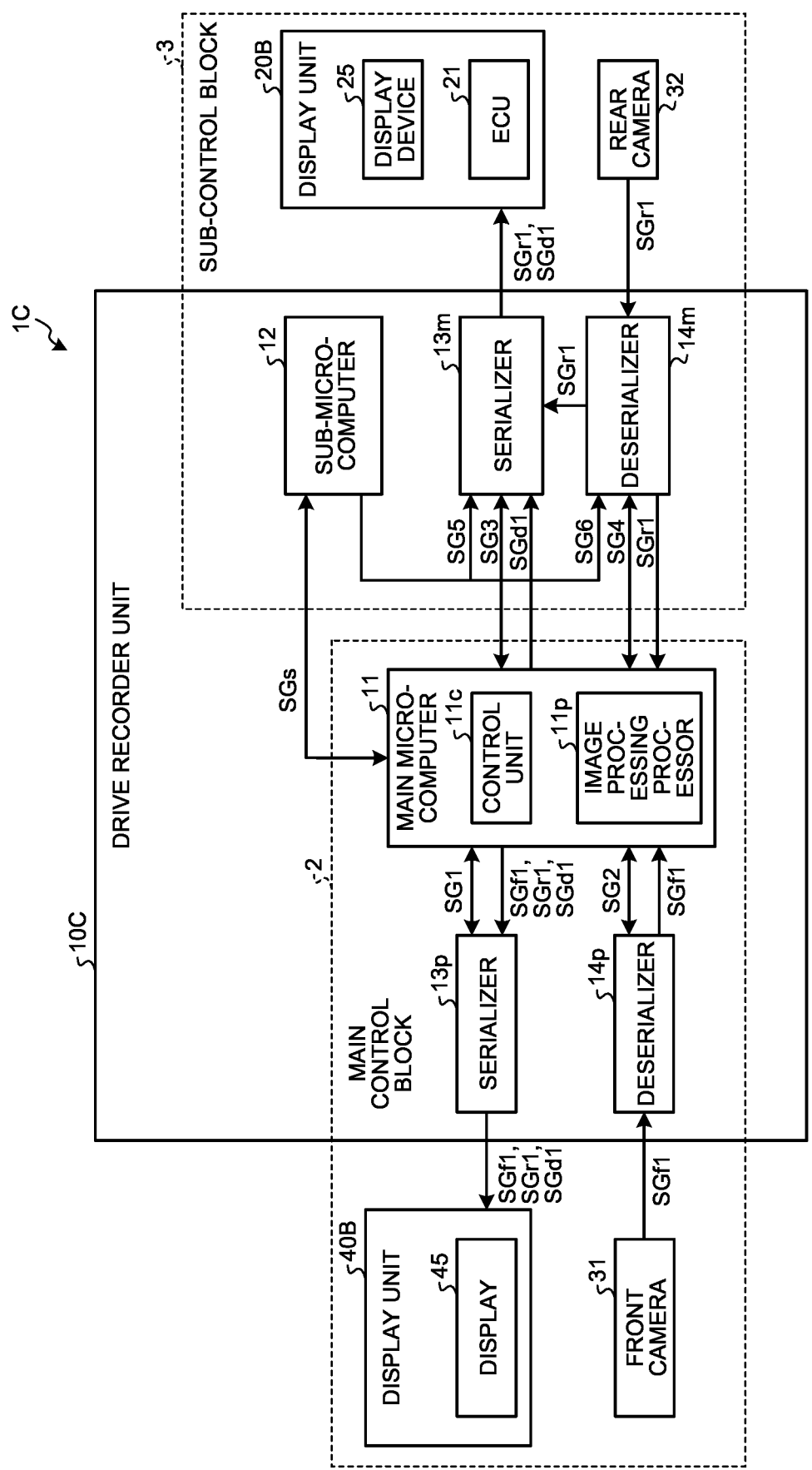
FIG. 8 is a block diagram illustrating an example of a configuration of a video processing system according to a fourth embodiment.

FIG. 8 is a block diagram illustrating an example of a configuration of a video processing system 1C according to the fourth embodiment.

The drive recorder unit 10C includes the main microcomputer 11, the sub-microcomputer 12, the serializer 13m, and the deserializer 14m. The drive recorder unit 10C may also include the serializer 13p and the deserializer 14p. The following describes an example that the drive recorder unit 10C includes the serializer 13p and the deserializer 14p.

The sub-microcomputer 12 notifies the main microcomputer 11 of status information by transmitting the status signal SGs to the main microcomputer 11. The main microcomputer 11 notifies the sub-microcomputer 12 of the status information by transmitting the status signal SGs to the sub-microcomputer 12. In the present embodiment, the status information includes information about whether the main microcomputer 11 can generate the first signal.

The main microcomputer 11 may transmit the first signal SGd1 to the display unit 20B via the sub-microcomputer 12. The main microcomputer 11 may transmit the first signal SGd1 to the sub-microcomputer 12. Transmission of the first signal SGd1 from the main microcomputer 11 to the sub-microcomputer 12 is performed by SPI communication in the I2C format, for example. The sub-microcomputer 12 may transmit the first signal SGd1 received from the main microcomputer 11 to the display unit 20B. The sub-microcomputer 12 may transmit the first signal SGd1 to the display unit 20B via the serializer 13m. Transmission of the first signal SGd1 from the sub-microcomputer 12 to the serializer 13m, and transmission of the first signal SGd1 from the serializer 13m to the display unit 20B are performed in the I2C format, for example. The sub-microcomputer 12 may directly transmit the first signal SGd1 to the display unit 20B. Transmission of the first signal SGd1 from the sub-microcomputer 12 to the display unit 20B is performed with a CAN, for example.

The drive recorder unit 10C may be able to switch between the first mode for causing the display device 25 to display the first video and the second mode for causing the display device 25 to display the second video. In a case that the drive recorder unit 10C operates in the first mode, the sub-microcomputer 12 controls the serializer 13m to transmit the video signal SGr1 to the display unit 20B by transmitting the control signal SG5. In a case that the drive recorder unit 10C operates in the second mode, the main microcomputer 11 controls the serializer 13m to transmit the video signal SGr1 and the first signal SGd1 to the display unit 20B by transmitting the control signal SG3.

Figure 9:
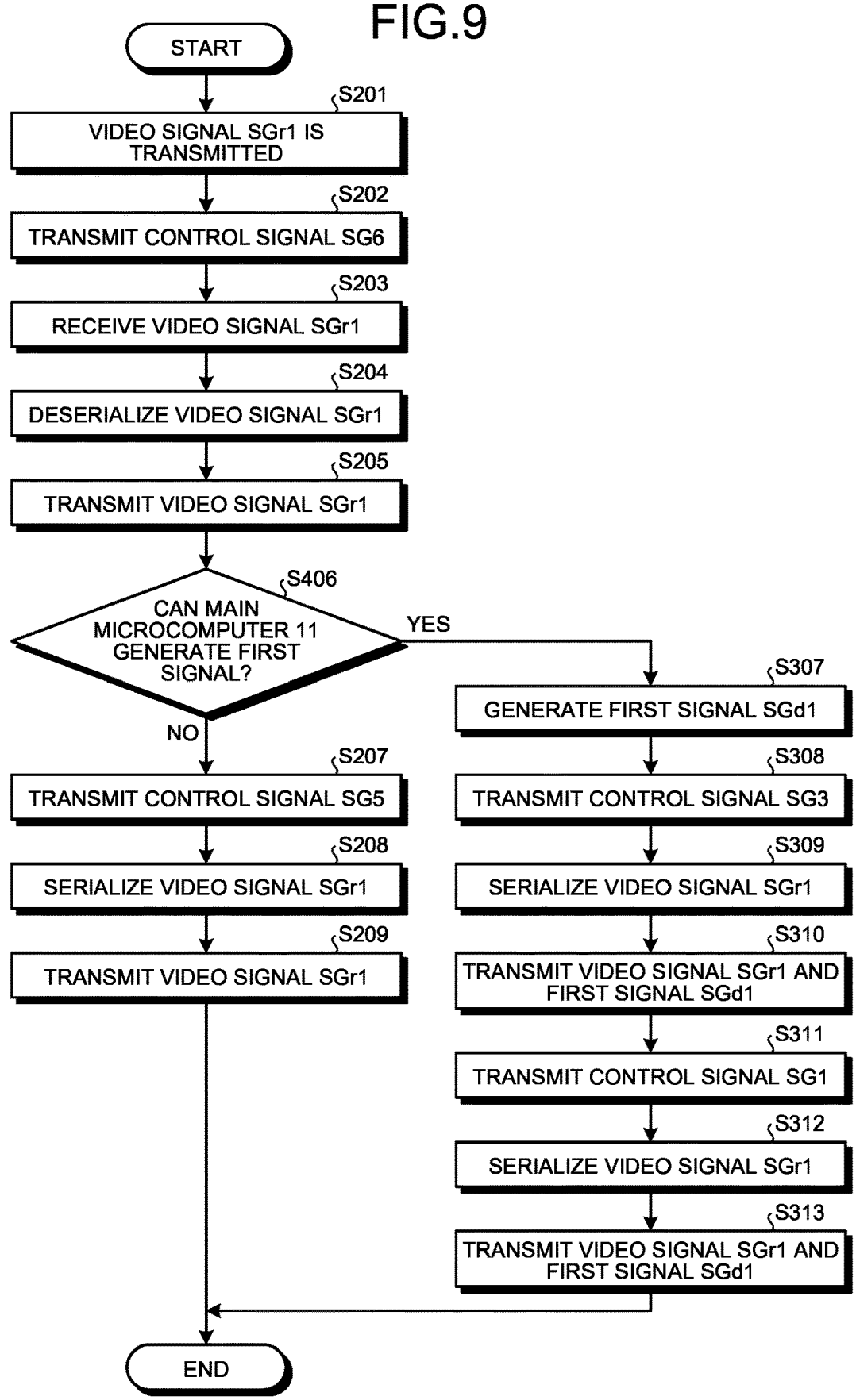
FIG. 9 is a flowchart illustrating an example of a processing procedure performed by a drive recorder unit according to the fourth embodiment.

Processing example of drive recorder unit Next, the following describes an example of processing performed by the drive recorder unit 10C according to the fourth embodiment with reference to FIG. 9. FIG. 9 is a flowchart illustrating an example of a processing procedure performed by the drive recorder unit 10C according to the fourth embodiment. The following describes only processing for the video signal generated by the rear camera 32.

Step S201 to Step S205 are the same as those in the second embodiment, so that description thereof is omitted.

At Step S406, the following processing branches depending on whether the main microcomputer 11 can generate the first signal. The state that the main microcomputer 11 can generate the first signal refers to a state that a predetermined time has elapsed from start-up of the main microcomputer 11, for example. The sub-microcomputer 12 receives, as the status signal SGs, a status indicating whether the main microcomputer 11 can generate the first signal from the main microcomputer 11.

In a case that the main microcomputer 11 cannot generate the first signal (No at Step S406), the sub-microcomputer 12 performs processing of causing the drive recorder unit 10C to operate in the first mode. Specifically, processes at Step S207 to Step S209 are performed. Step S207 to Step S209 are the same as those in the second embodiment, so that description thereof is omitted.

In a case that the main microcomputer 11 can generate the first signal (Yes at Step S406), the main microcomputer 11 performs processing of causing the drive recorder unit 10C to operate in the second mode. Specifically, processes at Step S307 to Step S313 are performed. Step S307 to Step S313 are the same as those in the third embodiment, so that description thereof is omitted.

The processing performed by the drive recorder unit 10C ends.

Advantage of Fourth Embodiment

The same advantage as that in the second embodiment and the third embodiment can also be achieved in the present embodiment.

Fifth Embodiment

A drive recorder unit 10D according to a fifth embodiment is different from the drive recorder unit 10B according to the third embodiment in that, an ECU transmits the first signal SGd1 instead of the image processing processor 11p. The following describes the drive recorder unit 10D with reference to FIG. 10 and FIG. 11. The same configuration and operation as the configuration and the operation described in the first embodiment to the fourth embodiment are denoted by the same reference numerals, and description thereof will be omitted or simplified.

Configuration Example of Video Processing System

Figure 10:
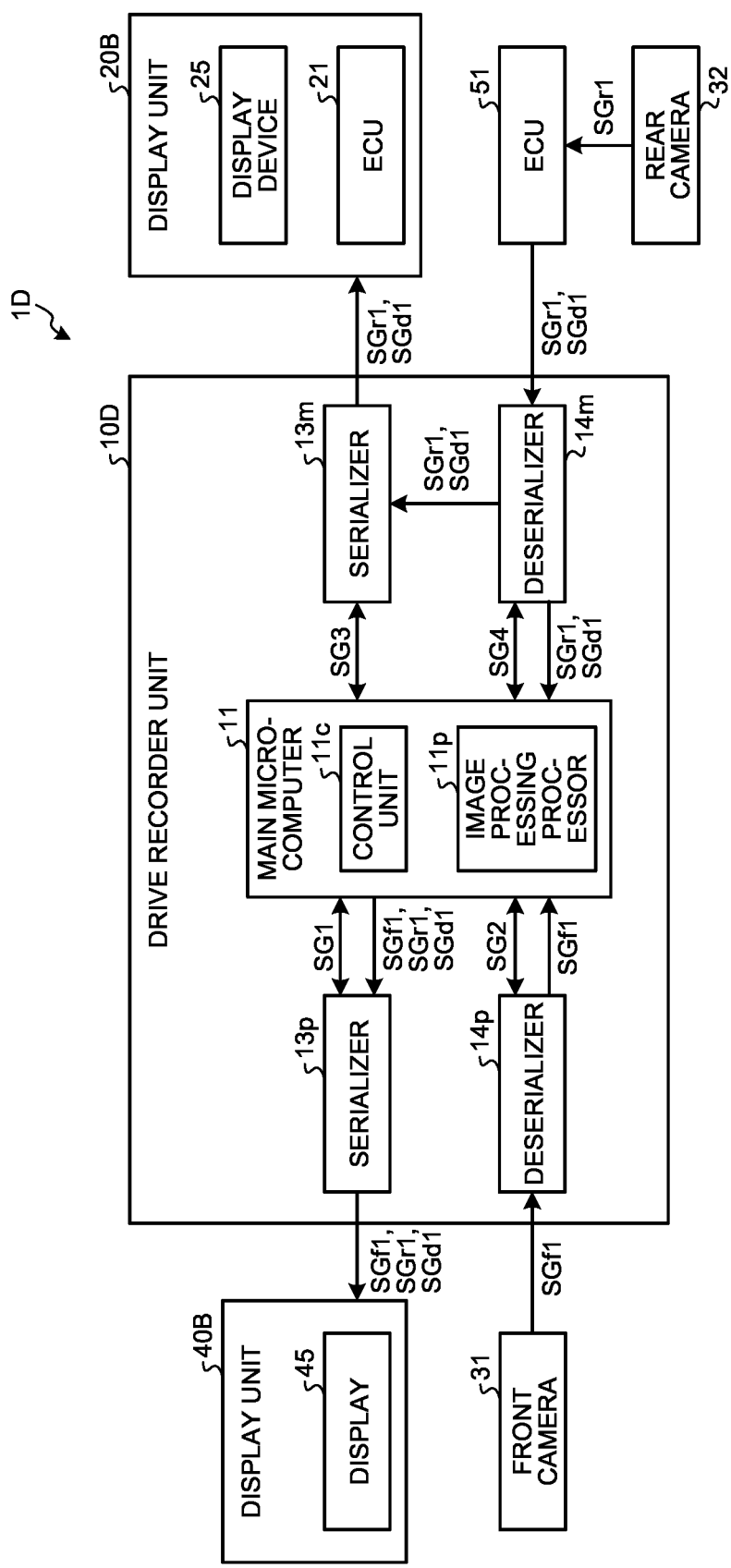
FIG. 10 is a block diagram illustrating an example of a configuration of a video processing system according to a fifth embodiment.

FIG. 10 is a block diagram illustrating an example of a configuration of a video processing system 1D according to the fifth embodiment. As illustrated in FIG. 10, the video processing system 1D according to the third embodiment includes the drive recorder unit 10D, the display unit 20B, the rear camera 32, and an ECU 51.

The drive recorder unit 10D includes the main microcomputer 11, the serializer 13m, and the deserializer 14m. The drive recorder unit 10D may also include the serializer 13p and the deserializer 14p. The following describes an example that the drive recorder unit 10D includes the serializer 13p and the deserializer 14p.

The ECU 51 is an electronic control unit. The ECU 51 is configured as part of an engine control unit (ECU), an IVI system, or a cockpit domain controller (CDC), each being installed in the vehicle, for example. The ECU 51 generates the first signal SGd1 based on the video signal SGr1 received from the rear camera 32. Generation of the first signal SGd1 by the ECU 51 is the same as generation of the first signal SGd1 by the image processing processor 11p described in the foregoing third embodiment. The ECU 51 transmits the video signal SGr1 and the first signal SGd1 to the deserializer 14m. Transmission of the first signal SGd1 from the ECU 51 to the deserializer 14m is performed in the I2C format, for example.

When the video signal SGr1 and the first signal SGd1 are transmitted from the ECU 51, the main microcomputer 11 causes the deserializer 14m to receive the video signal SGr1 and the first signal SGd1 by transmitting the control signal SG4 to the deserializer 14m.

Upon receiving the control signal SG4 from the main microcomputer 11, the deserializer 14m receives the video signal SGr1 and the first signal SGd1. The deserializer 14m transmits the video signal SGr1 and the first signal SGd1 to the main microcomputer 11 and the serializer 13m. Transmission of the first signal SGd1 from the deserializer 14m to the serializer 13m is performed in the I2C format, for example.

The main microcomputer 11 receives the video signal SGr1 and the first signal SGd1 from the deserializer 14m. Specifically, the image processing processor 11p receives the video signal SGr1 and the first signal SGd1 from the deserializer 14m. The image processing processor 11p transmits the video signal SGr1 and the first signal SGd1 to the serializer 13p. In other words, the main microcomputer 11 transmits the video signal SGr1 and the first signal SGd1 to the serializer 13p. In the present embodiment, the main microcomputer 11 is not required to transmit the video signal SGr1 and the first signal SGd1 to the serializer 13m.

Upon receiving the control signal SG3 from the main microcomputer 11, the serializer 13m transmits the video signal SGr1 received from the deserializer 14m alone, or the video signal SGr1 and the first signal SGd1 received from the main microcomputer 11 to the display unit 20B.

Processing Example of Drive Recorder Unit

Figure 11:
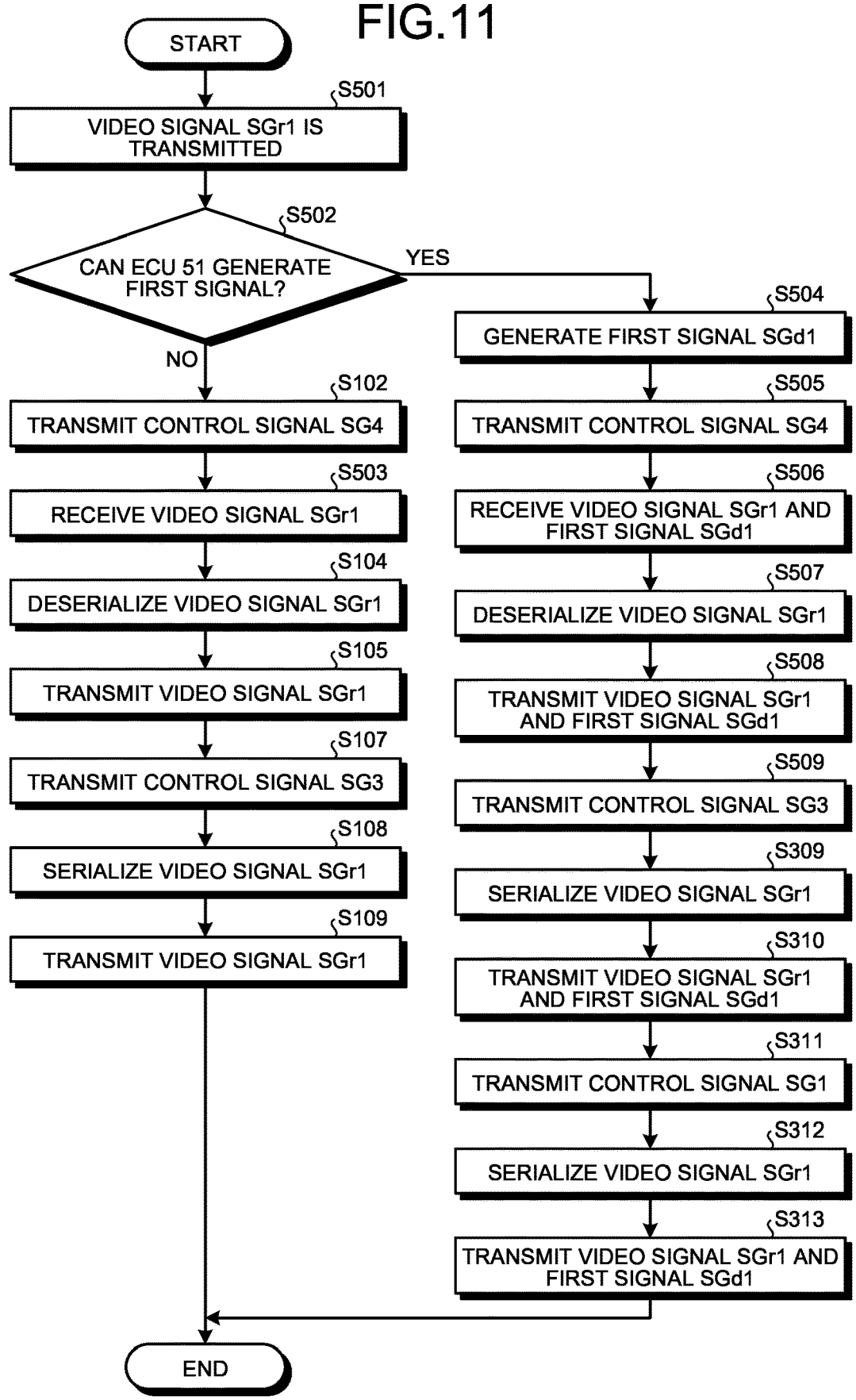
FIG. 11 is a flowchart illustrating an example of a processing procedure performed by the video processing system according to the fifth embodiment.

Next, the following describes an example of processing performed by the video processing system 1D according to the fifth embodiment with reference to FIG. 11. FIG. 11 is a flowchart illustrating an example of a processing procedure performed by the video processing system 1D according to the fifth embodiment. The following describes only processing for the video signal generated by the rear camera 32.

The video signal SGr1 is transmitted from the rear camera 32 to the ECU 51 (Step S501).

The following processing branches depending on whether the ECU 51 can generate the first signal (Step S502). The state that the ECU 51 can generate the first signal refers to a state that a predetermined time has elapsed from start-up of the ECU 51, for example.

In a case that the ECU 51 cannot generate the first signal (No at Step S502), the main microcomputer 11 performs processing of causing the drive recorder unit 10D to operate in the first mode. Specific processing is described below.

The main microcomputer 11 transmits, as the control signal SG4 to the deserializer 14m, a command to receive the video signal SGr1 (Step S102).

Upon receiving the control signal SG4, the deserializer 14m receives the video signal SGr1 from the ECU 51 (Step S503). Processes at Step S104, Step S105, and Step S107 to Step S109 are subsequently performed. Step S104, Step S105, and Step S107 to Step S109 are the same as those in the first embodiment, so that description thereof is omitted.

In a case that the ECU 51 can generate the first signal (Yes at Step S502), the ECU 51 generates the first signal SGd1 based on the video signal SGr1 (Step S504). The main microcomputer 11 performs processing of causing the drive recorder unit 10D to operate in the second mode. Specific processing is described below.

The main microcomputer 11 transmits, as the control signal SG4 to the deserializer 14m, a command to receive the video signal SGr1 and the first signal SGd1 (Step S505).

Upon receiving the control signal SG4, the deserializer 14m receives the video signal SGr1 and the first signal SGd1 from the ECU 51 (Step S506). The deserializer 14m deserializes the video signal SGr1 to be converted into parallel data (Step S507). The deserializer 14m transmits, to the main microcomputer 11 and the serializer 13m, the video signals SGr1 converted into the parallel data and the first signal SGd1 (Step S508).

The main microcomputer 11 transmits, as the control signal SG3 to the serializer 13m, a command to transmit the video signal SGr1 and the first signal SGd1 (Step S509).

Processes at Step S309 to Step S313 are subsequently performed. Step S309 to Step S313 are the same as those in the third embodiment, so that description thereof is omitted.

The processing at Steps S508 to S310 and the processing at Steps S311 to S313 described above may be performed in parallel.

The processing performed by the video processing system 1D according to the embodiment ends.

Advantage of Fifth Embodiment

The same advantage as that in the third embodiment can also be achieved in the present embodiment. In addition, in the present embodiment, the ECU 51 transmits the first signal SGd1 instead of the image processing processor 11p. That is, the image processing processor 11p does not necessarily have the function of generating the first signal SGd1. For example, the image processing processor 11p does not necessarily have the function of detecting an object present around the vehicle 5. With this configuration, an inexpensive processor can be used as the image processing processor 11p.

The drive recorder unit 10D according to the present embodiment may also include a sub-microcomputer as described in the second embodiment. In this case, the same advantage as that in the second embodiment can be achieved.

Sixth Embodiment

A drive recorder unit 10E according to a sixth embodiment is different from the drive recorder unit 10B according to the third embodiment in that, a display device 15 is integrally installed in the drive recorder unit 10E. The following describes the drive recorder unit 10E with reference to FIG. 12 and FIG. 13. The same configuration and operation as the configuration and the operation described in the first embodiment to the fifth embodiment are denoted by the same reference numerals, and description thereof will be omitted or simplified.

Configuration Example of Video Processing System

Figure 12:
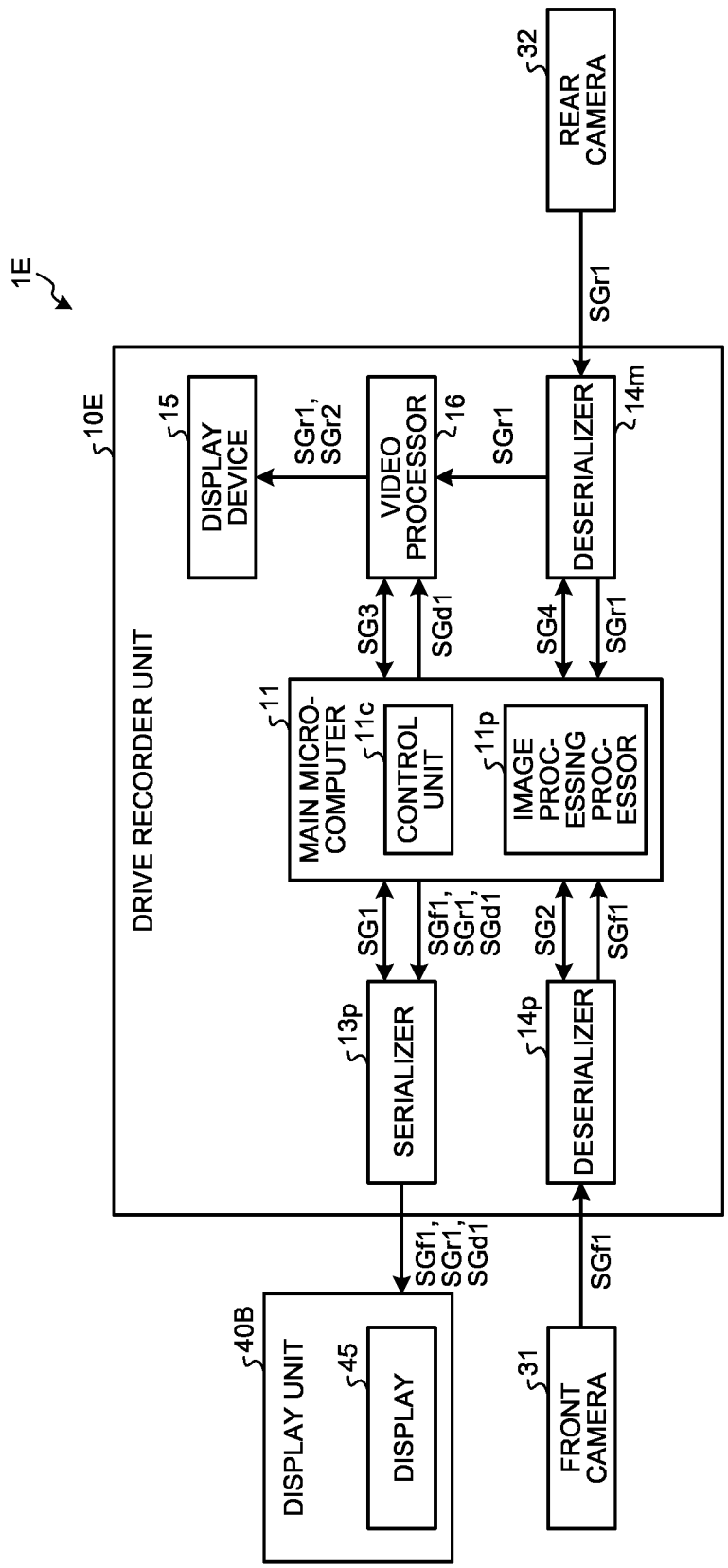
FIG. 12 is a block diagram illustrating an example of a configuration of a video processing system according to a sixth embodiment.

FIG. 12 is a block diagram illustrating an example of a configuration of a video processing system 1E according to the sixth embodiment. As illustrated in FIG. 12, the video processing system 1E according to the sixth embodiment includes the drive recorder unit 10E and the rear camera 32. The video processing system 1E may also include the display unit 40B.

The drive recorder unit 10E includes the main microcomputer 11, the deserializer 14m, a display device 15, and a video processor 16. The drive recorder unit 10E may also include the serializer 13p and the deserializer 14p. The following describes an example that the drive recorder unit 10E includes the serializer 13p and the deserializer 14p.

The video processor 16 is configured similarly to the ECU 21. The video processor 16 corresponds to the video signal generation unit. The video signal SGr1 or the video signal SGr2, on which video processing has been performed by the video processor 16, is passed to the display device 15. The video processor 16 may perform video processing after serializing the video signal SGr1 and the video signal SGr2.

The drive recorder unit 10E may be able to switch between the first mode for causing the display device 15 to display the first video and the second mode for causing the display device 15 to display the second video. In a case that the drive recorder unit 10E operates in the first mode, the main microcomputer 11 controls the video processor 16 to cause the display device 15 to display the first video by transmitting the control signal SG3. Specifically, the video processor 16 performs video processing on the video signal SGr1, and transmits the video signal SGr1 subjected to the video processing to the display device 15. In a case that the drive recorder unit 10E operates in the second mode, the main microcomputer 11 controls the video processor 16 to cause the display device 15 to display the second video by transmitting the control signal SG3. Specifically, the video processor 16 generates the video signal SGr2 by adding the first signal SGd1 to the video signal SGr1. The video processor 16 also performs video processing on the video signal SGr2, and transmits the video signal SGr2 subjected to the video processing to the display device 15.

The display device 15 displays the first video generated based on the video signal SGr1, or the second video generated based on the video signal SGr2. The first video and the second video are used for checking on an area behind the vehicle 5, for example. The display device 15 is configured similarly to the display device 25. In the present embodiment, the display device 15 is an electron mirror in a shape of a room mirror. In other words, the drive recorder unit 10E is a device in which the electron mirror and a drive recorder are integrally installed.

In the present embodiment, the image processing processor 11p transmits the first signal SGd1 to the video processor 16. In other words, the main microcomputer 11 transmits the first signal SGd1 to the video processor 16. The main microcomputer 11 may convert the first signal SGd1 into parallel data to be transmitted to the video processor 16. Transmission of the first signal SGd1 from the main microcomputer 11 to the video processor 16 is performed in the I2C format, for example.

The deserializer 14m transmits the video signal SGr1 to the main microcomputer 11 and the video processor 16. The deserializer 14m may convert the received video signal SGr1 into parallel data to be transmitted. Transmission of the video signal SGr1 from the deserializer 14m to the video processor 16 is performed in the MIPI format, for example.

Figure 13:
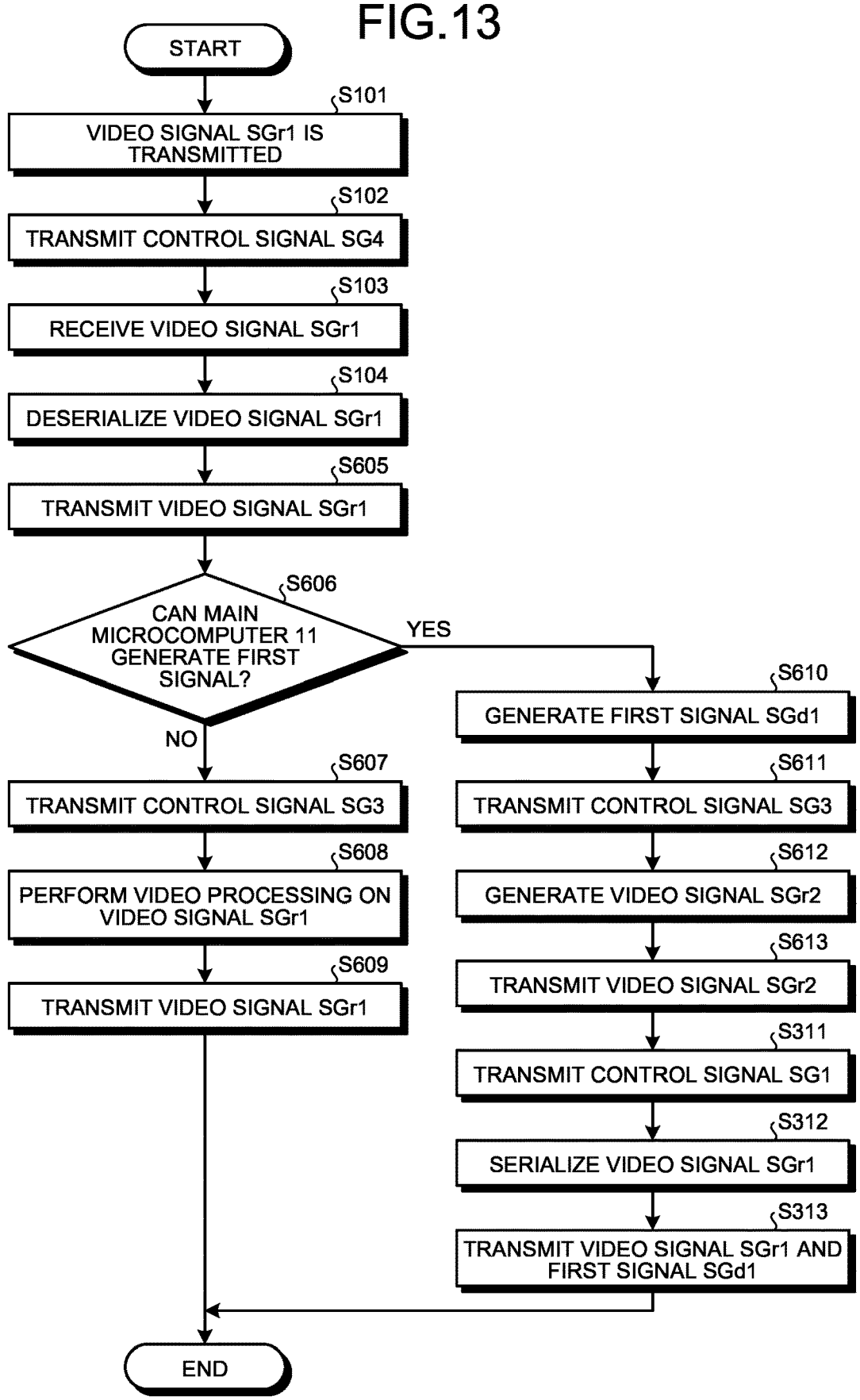
FIG. 13 is a flowchart illustrating an example of a processing procedure performed by a drive recorder unit according to the sixth embodiment.

Processing example of drive recorder unit Next, the following describes an example of processing performed by the drive recorder unit 10E according to the sixth embodiment with reference to FIG. 13. FIG. 13 is a flowchart illustrating an example of a processing procedure performed by the drive recorder unit 10E according to the sixth embodiment. The following describes only processing for the video signal generated by the rear camera 32.

Step S101 to Step S104 are the same as those in the first embodiment, so that description thereof is omitted.

The deserializer 14m transmits the video signal SGr1 converted into parallel data to the main microcomputer 11 and the video processor 16 (Step S605).

At Step S606, the following processing branches depending on whether the main microcomputer 11 can generate the first signal. In a case that the main microcomputer 11 cannot generate the first signal (No at Step S606), the main microcomputer 11 performs processing of causing the drive recorder unit 10 to operate in the first mode. Specifically, the main microcomputer 11 transmits, as the control signal SG3 to the video processor 16, a command to transmit the video signal SGr1 (Step S607).

Upon receiving the control signal SG3, the video processor 16 performs video processing on the video signal SGr1 received from the deserializer 14m (Step S608). The video processor 16 transmits the video signal SGr1 subjected to the video processing to the display device 15 (Step S609).

In a case that the main microcomputer 11 can generate the first signal (Yes at Step S606), the main microcomputer 11 performs processing of causing the drive recorder unit 10E to operate in the second mode. Specific processing is described below. The main microcomputer 11 receives the video signal SGr1 from the deserializer 14m. The image processing processor 11p generates the first signal SGd1 based on the video signal SGr1 (Step S610).

The main microcomputer 11 transmits the first signal SGd1 to the video processor 16. The main microcomputer 11 also transmits, as the control signal SG3 to the video processor 16, a command to transmit the video signal SGr1 and the first signal SGd1 (Step S611).

Upon receiving the control signal SG3, the video processor 16 generates the video signal SGr2 by adding the first signal SGd1 to the video signal SGr1 received from the deserializer 14m. The video processor 16 also performs video processing on the video signal SGr2 (Step S612). The video processor 16 transmits the video signal SGr2 subjected to the video processing to the display device 15 (Step S613).

Processes at Step S311 to Step S313 are subsequently performed. Step S311 to Step S313 are the same as those in the third embodiment, so that description thereof is omitted.

The processing at Steps S611 to S613 and the processing at Steps S311 to Step S313 described above may be performed in parallel.

The processing performed by the drive recorder unit 10E according to the embodiment ends.

Advantage of Sixth Embodiment

The same advantage as that in the third embodiment can also be obtained in the present embodiment. In the present embodiment, the display device 15 is integrally installed in the drive recorder unit 10E. With this configuration, steps of imaging processing and a transmission path of image information required between the imaging process to the video display process can be shortened.

The drive recorder unit 10D according to the present embodiment may also include a sub-microcomputer as described in the foregoing second embodiment. In this case, the same advantage as that in the second embodiment can be achieved.

In each embodiment of the present disclosure, the drive recorder unit causes the display device 25 and the display 45 to display the video. Alternatively, the drive recorder unit may cause another display to display the video. For example, the drive recorder unit may cause a meter display or a head-up display to display the video.

The drive recorder unit in each embodiment of the present disclosure may be integrated with an IVI system and be configured as part of the IVI system.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The video processing device and the video processing system according to the present disclosure is capable of displaying, at a predetermined timing, a video to which image processing has been subjected while maintaining a state that the video is displayed.

What is claimed is:

1. A video processing device installable in a vehicle, the vehicle including: a camera imaging an outside of the vehicle and generating a first video signal; and a display being able to display a first video and a second video, the first video being generated based on the first video signal, the second video being generated based on a second video signal obtained by adding a first signal to the first video signal, the video processing device comprising:
 a first computer configured to control a first reception circuit and a first transmission circuit; and
 a second computer different from the first computer, the second computer entirely including a hardware processor, wherein
 the first reception circuit is configured to receive the first video signal directly from the camera,
 the hardware processor, which is entirely included within the second computer, is configured to receive the first video signal directly from the first reception circuit and configured to generate the first signal based on the first video signal, and
 the first transmission circuit is configured to
 receive the first video signal directly from the first reception circuit,
 receive the first signal directly from the hardware processor, and
 transmit the first video signal and the first signal directly to the display.

2. The video processing device according to claim 1, wherein the display includes a controller configured to generate the second video signal by adding the first signal to the first video signal.

3. The video processing device according to claim 1, wherein the video processing device is configured to switch between a first mode for causing the display to display the first video and a second mode for causing the display to display the second video.

4. The video processing device according to claim 3, wherein,
 in the first mode, the first computer causes the first transmission circuit to transmit the first video signal to the display, and
 in the second mode, the second computer causes the first transmission circuit to transmit the first video signal and the first signal to the display.

5. The video processing device according to claim 1, wherein the first computer and the second computer operate independently.

6. The video processing device according to claim 1, wherein the hardware processor detects an object present around the vehicle based on the first video signal, and generates, as the first signal, an emphasis signal for emphasizing the object.

7. The video processing device according to claim 1, wherein a distance between the first transmission circuit and the hardware processor is smaller than a distance between the first transmission circuit and the display.

8. The video processing device according to claim 1, wherein the first signal is not a video signal.

9. The video processing device according to claim 1, wherein the first video signal is transmitted from the first reception circuit to the hardware processor in a first format and the first signal is transmitted from the hardware processor to the first transmission circuit in a second format that is different from the first format.

10. The video processing device according to claim 1, wherein the first computer is physically separate and independent from the first transmission circuit and the first reception circuit.

11. The video processing device according to claim 1, wherein the first computer is physically separate from and not directly connected to: a first circuit by which the first reception circuit receives the first video signal directly from the camera; and a second circuit by which the first transmission circuit transmits the first video signal and the first signal directly to the display.

12. A video processing system installable in a vehicle, the video processing system comprising:
 a camera configured to image an outside of the vehicle and generate a first video signal;
 a display configured to display a first video and a second video, the first video being generated based on the first video signal, the second video being generated based on a second video signal obtained by adding a first signal to the first video signal; and a video processing device configured to generate the first signal,
wherein the video processing device includes:
a first computer configured to control a first reception circuit and a first transmission circuit; and
a second computer different from the first computer, the second computer entirely including a hardware processor,
the first reception circuit is configured to receive the first video signal directly from the camera,
the hardware processor, which is entirely included within the second computer, is configured to receive the first video signal directly from the first reception circuit and configured to generate the first signal based on the first video signal, and
the first transmission circuit is configured to
receive the first video signal directly from the first reception circuit,
receive the first signal directly from the hardware processor, and
transmit the first video signal and the first signal directly to the display.

13. The video processing system according to claim 12, wherein the display includes a controller configured to generate the second video signal by adding the first signal to the first video signal.

14. The video processing system according to claim 12, wherein the video processing device is configured to switch between a first mode for causing the display to display the first video and a second mode for causing the display to display the second video.

15. The video processing system according to claim 14, wherein
in the first mode, the first computer causes the first transmission circuit to transmit the first video signal to the display, and
in the second mode, the second computer causes the first transmission circuit to transmit the first video signal and the first signal to the display.

16. The video processing system according to claim 12, wherein the first computer and the second computer operate independently.

17. The video processing system according to claim 12, wherein the hardware processor detects an object present around the vehicle based on the first video signal, and generates an emphasis signal for emphasizing the object as the first signal.

18. The video processing system according to claim 12, wherein a distance between the first transmission circuit and the hardware processor is smaller than a distance between the first transmission circuit and the display.

19. The video processing system according to claim 12, wherein the first signal is not a video signal.

20. The video processing system according to claim 12, wherein the first video signal is transmitted from the first reception circuit to the hardware processor in a first format and the first signal is transmitted from the hardware processor to the first transmission circuit in a second format that is different from the first format.

* * * * *